United States Patent
Hoang et al.

(10) Patent No.: US 11,568,200 B2
(45) Date of Patent: Jan. 31, 2023

(54) ACCELERATING SPARSE MATRIX MULTIPLICATION IN STORAGE CLASS MEMORY-BASED CONVOLUTIONAL NEURAL NETWORK INFERENCE

(71) Applicant: SanDisk Technologies LLC, Addison, TX (US)

(72) Inventors: Tung Thanh Hoang, San Jose, CA (US); Won Ho Choi, San Jose, CA (US); Martin Lueker-Boden, Fremont, CA (US)

(73) Assignee: SanDisk Technologies LLC, Addison, TX (US)

( * ) Notice: Subject to any disclaimer, the term of this patent is extended or adjusted under 35 U.S.C. 154(b) by 638 days.

(21) Appl. No.: 16/653,346

(22) Filed: Oct. 15, 2019

(65) Prior Publication Data

US 2021/0110235 A1    Apr. 15, 2021

(51) Int. Cl.
*G06F 17/15* (2006.01)
*G06N 3/04* (2006.01)
*G06F 17/16* (2006.01)

(52) U.S. Cl.
CPC ............... *G06N 3/04* (2013.01); *G06F 17/15* (2013.01); *G06F 17/16* (2013.01)

(58) Field of Classification Search
None
See application file for complete search history.

(56) References Cited

U.S. PATENT DOCUMENTS

| | | | |
|---|---|---|---|
| 7,324,366 | B2 | 1/2008 | Bednorz et al. |
| 7,505,347 | B2 | 3/2009 | Rinerson et al. |
| 8,416,624 | B2 | 4/2013 | Lei et al. |
| 8,634,247 | B1 | 1/2014 | Sprouse et al. |
| 8,634,248 | B1 | 1/2014 | Sprouse et al. |

(Continued)

FOREIGN PATENT DOCUMENTS

| | | |
|---|---|---|
| CN | 110597555 A | 12/2019 |
| CN | 110598858 A | 12/2019 |
| KR | 10-2019-009467 A | 8/2019 |

OTHER PUBLICATIONS

Rastegari, Mohammad et al., "XNOR-Net: ImageNet Classification Using Binary Convolutional Neural Networks," proceedings ECCV 2016, Aug. 2016, 55 pages.

(Continued)

*Primary Examiner* — Craig C Dorais
(74) *Attorney, Agent, or Firm* — Vierra Magen Marcus LLP

(57) ABSTRACT

Techniques are presented for accelerating in-memory matrix multiplication operations for a convolution neural network (CNN) inference in which the weights of a filter are stored in the memory of a storage class memory device, such as a ReRAM or phase change memory based device. To improve performance for inference operations when filters exhibit sparsity, a zero column index and a zero row index are introduced to account for columns and rows having all zero weight values. These indices can be saved in a register on the memory device and when performing a column/row oriented matrix multiplication, if the zero row/column index indicates that the column/row contains all zero weights, the access of the corresponding bit/word line is skipped as the result will be zero regardless of the input.

20 Claims, 23 Drawing Sheets

(56) References Cited

U.S. PATENT DOCUMENTS

| | | |
|---|---|---|
| 8,773,909 B2 | 7/2014 | Li et al. |
| 8,780,632 B2 | 7/2014 | Sprouse et al. |
| 8,780,633 B2 | 7/2014 | Sprouse et al. |
| 8,780,634 B2 | 7/2014 | Sprouse et al. |
| 8,780,635 B2 | 7/2014 | Li et al. |
| 8,792,279 B2 | 7/2014 | Li et al. |
| 8,811,085 B2 | 8/2014 | Sprouse et al. |
| 8,817,541 B2 | 8/2014 | Li et al. |
| 9,098,403 B2 | 8/2015 | Sprouse et al. |
| 9,104,551 B2 | 8/2015 | Spouse et al. |
| 9,116,796 B2 | 8/2015 | Sprouse et al. |
| 9,384,126 B1 | 7/2016 | Sprouse et al. |
| 9,430,735 B1 | 8/2016 | Vali et al. |
| 9,887,240 B2 | 2/2018 | Shimabukuro et al. |
| 9,965,208 B1 | 5/2018 | Roohparvar et al. |
| 10,127,150 B2 | 11/2018 | Sprouse et al. |
| 10,459,724 B2 | 10/2019 | Yu et al. |
| 10,535,391 B2 | 1/2020 | Osada et al. |
| 11,170,290 B2 | 11/2021 | Hoang et al. |
| 11,328,204 B2 | 5/2022 | Choi et al. |
| 2014/0133228 A1 | 5/2014 | Sprouse et al. |
| 2014/0133233 A1 | 5/2014 | Li et al. |
| 2014/0133237 A1 | 5/2014 | Sprouse et al. |
| 2014/0136756 A1 | 5/2014 | Sprouse et al. |
| 2014/0136757 A1 | 5/2014 | Sprouse et al. |
| 2014/0136758 A1 | 5/2014 | Sprouse et al. |
| 2014/0136760 A1 | 5/2014 | Sprouse et al. |
| 2014/0136762 A1 | 5/2014 | Li et al. |
| 2014/0136763 A1 | 5/2014 | Li et al. |
| 2014/0136764 A1 | 5/2014 | Li et al. |
| 2014/0156576 A1 | 6/2014 | Nugent |
| 2014/0136761 A1 | 7/2014 | Li et al. |
| 2014/0294272 A1 | 10/2014 | Madabhushi et al. |
| 2015/0324691 A1 | 11/2015 | Dropps et al. |
| 2016/0026912 A1 | 1/2016 | Falcon et al. |
| 2016/0054940 A1 | 2/2016 | Khoueir et al. |
| 2017/0017879 A1 | 1/2017 | Kataeva |
| 2017/0054032 A1 | 2/2017 | Tsukamoto |
| 2017/0098156 A1 | 4/2017 | Nino et al. |
| 2017/0228637 A1 | 8/2017 | Santoro et al. |
| 2018/0039886 A1 | 2/2018 | Umuroglu et al. |
| 2018/0075339 A1 | 3/2018 | Ma et al. |
| 2018/0082181 A1 | 3/2018 | Brothers et al. |
| 2018/0144240 A1 | 5/2018 | Garbin et al. |
| 2018/0315473 A1 | 11/2018 | Yu et al. |
| 2019/0065896 A1 | 2/2019 | Lee et al. |
| 2019/0087715 A1 | 3/2019 | Jeng |
| 2019/0108436 A1 | 4/2019 | David et al. |
| 2019/0221257 A1 | 7/2019 | Jeng et al. |
| 2019/0251425 A1 | 8/2019 | Jaffari et al. |
| 2020/0034697 A1 | 1/2020 | Choi et al. |
| 2020/0202203 A1 | 6/2020 | Nakayama et al. |
| 2020/0234137 A1 | 7/2020 | Chen et al. |
| 2020/0301668 A1 | 9/2020 | Li |
| 2020/0311523 A1 | 10/2020 | Hoang et al. |
| 2021/0110244 A1 | 4/2021 | Hoang et al. |
| 2022/0100508 A1* | 3/2022 | Pawlowski ......... G06F 9/30036 |
| 2022/0179703 A1* | 6/2022 | Vincent ................... G06F 9/547 |

OTHER PUBLICATIONS

Wan, Diwen, et al., "TBN: Convolutional Neural Network with Ternary Inputs and Binary Weights," ECCV 2018, Oct. 2018, 18 pages.
Chen, Yu-Hsin, et al., "Eyeriss: An Energy-Efficient Reconfigurable Accelerator for Deep Convolutional Neural Networks," IEEE Journal of Solid-State Circuits, Feb. 2016, 12 pages.
Sun, Xiaoyu, et al., "Fully Parallel RRAM Synaptic Array for Implementing Binary Neural Network with (+1, −1) Weights and (+1, 0) Neurons," 23rd Asia and South Pacific Design Automation Conference, Jan. 2018, 6 pages.
Gonugondla, Sujan K., et al., "Energy-Efficient Deep In-memory Architecture for NAND Flash Memories," IEEE International Symposium on Circuits and Systems (ISCAS), May 2018, 5 pages.
Nakahara, Hiroki, et al., "A Memory-Based Realization of a Binarized Deep Convolutional Neural Network," International Conference on Field-Programmable Technology (FPT), Dec. 2016, 4 pages.
Takeuchi, Ken, "Data-Aware NAND Flash Memory for Intelligent Computing with Deep Neural Network," IEEE International Electron Devices Meeting (IEDM), Dec. 2017, 4 pages.
Mochida, Reiji, et al., "A 4M Synapses integrated Analog ReRAM based 66.5 TOPS/W Neural-Network Processor with Cell Current Controlled Writing and Flexible Network Architecture," Symposium on VLSI Technology Digest of Technical Papers, Jun. 2018, 2 pages.
Chiu, Pi-Feng, et al., "A Differential 2R Crosspoint RRAM Array With Zero Standby Current," IEEE Transactions on Circuits and Systems—II: Express Briefs, vol. 62, No. 5, May 2015, 5 pages.
Chen, Wei-Hao, et al., "A 65nm 1Mb Nonvolatile Computing-in-Memory ReRAM Macro with Sub-16ns Mulitply-and-Accumulate for Binary DNN AI Edge Processors," IEEE International Solid-State Circuits Conference, Feb. 2018, 3 pages.
Liu, Rui, et al., "Parallelizing SRAM Arrays with Customized Bit-Cell for Binary Neural Networks," DAC '18, Jun. 2018, 6 pages.
Courbariaux, Matthieu, et al., "Binarized Neural Networks: Training Neural Networks with Weights and Activations Constrained to +1 or −1," arXiv.org, Mar. 2016, 11 pages.
Simon, Noah, et al., "A Sparse-Group Lasso," Journal of Computational and Graphical Statistics, vol. 22, No. 2, pp. 231-245, downloaded by Moskow State Univ Bibliote on Jan. 28, 2014.
"CS231n Convolutional Neural Networks for Visual Recognition," [cs231.github.io/neural-networks-2/#reg], downloaded on Oct. 15, 2019, pp. 1-15.
Krizhevsky, Alex, et al., "ImageNet Classification with Deep Convolutional Neural Networks," [http://code.google.com/p/cuda-convnet/], downloaded on Oct. 15, 2019, 9 pages.
Shafiee, Ali, et al., "ISAAC: A Convolutional Neural Network Accelerator with In-Situ Analog Arithmetic in Crossbars," ACM/IEEE 43rd Annual International Symposium on Computer Architecture (ISCA), Oct. 5, 2016, 13 pages.
Han, Song, et al., "Learning both Weights and Connections for Efficient Neural Networks," Conference paper, NIPS, Oct. 2015, 9 pages.
Jia, Yangqing, "Learning Semantic Image Representations at a Large Scale," Electrical Engineering and CS, University of Berkeley, Technical Report No. UCB/EECS-2014-93, May 16, 2014, 104 pages.
Wen, Wei, et al., "Learning Structured Sparsity in Deep Neural Networks," 30th Conference on Neural Information Processing Systems (NIPS 2016), Nov. 2016, 9 pages.
Wang, Peiqi, et al., "SNrram: An Efficient Sparse Neural Network Computation Architecture Based on Resistive Random-Access Memory," DAC '18, Jun. 24-29, 2018, 6 pages.
International Search Report & the Written Opinion of the International Searching Authority dated Sep. 11, 2020, International Application No. PCT/US2020/024625.
English Abstract of JP Publication No. JP2016/042359 published Mar. 31, 2016.
U.S. Appl. No. 16/901,302, filed Jun. 15, 2020.
Baugh, Charles R., et al., "A Two's Complement Parallel Array Multiplication Algorithm," IEEE Transactions on Computers, vol. C-22, No. 12, Dec. 1973, 3 pages.
Hoang, Tung Thanh, et al., "Data-Width-Driven Power Gating of Integer Arithmetic Circuits," IEEE Computer Society Annual Symposium on VLSI, Jul. 2012, 6 pages.
Choi, Won Ho, et al., "High-precision Matrix-Vector Multiplication Core using Binary NVM Cells," Powerpoint, Western Digital Research, downloaded on Jun. 15, 2020, 7 pages.
Ni, Leibin, et al., "An Energy-Efficient Digital ReRAM-Crossbar-Based CNN With Bitwise Parallelism," IEEE Journal of Exploratory Solid-State Computational Devices and Circuits, May 2017, 10 pages.
Zhou, Shuchang, et al., "DoReFa-Net: Training Low Bitwidth Convolutional Neural Networks with Low Bitwidth Gradients," [arXiv.org > cs > arXiv:1606.06160], Feb. 2, 2018, 13 pages.
U.S. Appl. No. 16/908,864, filed Jun. 23, 2020.

(56) References Cited

OTHER PUBLICATIONS

International Search Report & the Written Opinion of the International Searching Authority dated Jul. 9, 2020, International Application No. PCT/US2020/024612.

Houxiang Ji, et al., "RECOM: An Efficient Resistive Accelerator for Compressed Deep Neural Networks," in 2018 Design, Automation & Test in Europe Conference & Exhibition, Mar. 23, 2018, Abstract only.

Yang, Tzu-Hsien, et al., "Sparse ReRAM Engine: Joint Exploration of Activation and Weight Sparsity in Compressed Neural Networks," Computer Architecture, pp. 236-249, Jun. 26, 2019, Abstract only.

Zheng, Shixuan, et al., "An Efficient Kernel Transformation Architecture for Binary-and Ternary-Weight Neural Network Inference," DAC '18, Jun. 24-29, 2018, 6 pages.

Notice of Allowance dated Feb. 20, 2020, U.S. Appl. No. 16/405,178, filed May 7, 2019.

Resch, Salonik, et al., "PIMBALL: Binary Neural Networks in Spintronic Memory," ACM Trans Arch. Code Optim., vol. 37, No. 4, Article 111, Aug. 2018, 25 pages.

Zamboni, Maurizio, et al., "In-Memory Binary Neural Networks," Master's Thesis, Politecino Di Torino, Apr. 10, 2019, 327 pages.

Natsui, Masanori, et al., "Design of an energy-efficient XNOR gate based on MTJ-based nonvolatile logic-in-memory architecture for binary neural network hardware," Japanese Journal of Applied Physics 58, Feb. 2019, 8 pages.

U.S. Appl. No. 16/722,580, filed Dec. 20, 2019.

International Search Report & the Written Opinion of the International Searching Authority dated Jul. 30, 2020, International Application No. PCT/US2020/024615.

Chiu, Pi-Feng, et al., "A Binarized Neural Network Accelerator with Differential Crosspoint Memristor Array for Energy-Efficient MAC Operations," 2019 IEEE International Symposium on Circuits and Systems (ISCAS), May 2019, Abstract only.

Sun, Xiaoyu, et al., "Low-VDD Operation of SRAM Synaptic Array for Implementing Ternary Network," IEEE Transactions on Very Large Scale Integration (VLSI) Systems, vol. 25, No. 10, Jul. 2017, Abstract only.

Kim, Hyeonuk, et al., "NAND-Net: Minimizing Computational Complexity of In-Memory Processing for Binary Neural Networks," 2019 IEEE International Symposium on High Performance Computer Architecture (HPCA), Mar. 2019, Abstract only.

Notice of Allowance dated Mar. 11, 2020, U.S. Appl. No. 16/414,143, filed May 16, 2019.

Notice of Allowance dated Jan. 24, 2022, U.S. Appl. No. 16/368,347, filed Mar. 28, 2019.

Notice of Allowance dated Jul. 12, 2021, U.S. Appl. No. 16/368,441, filed Mar. 28, 2019.

Kim, Hyeonuk, et al., "NAND-Net: Minimizing Computational Complexity of In-Memory Processing for Binary Neural Networks," 2019 IEEE International Symposium on High Performance Computer Architecture (HPCA), Mar. 2019.

Ji, H., et al., "ReCOM: An efficient resistive accelerator for compressed deep neural networks," 2018 Design, Automation & Test in Europe Conference & Exhibition, 2018, pp. 237-240.

Restriction Requirement dated May 26, 2022, U.S. Appl. No. 16/653,365, filed Oct. 15, 2019.

Response to Restriction Requirement dated Aug. 24, 2022, U.S. Appl. No. 16/653,365, filed Oct. 15, 2019.

Non-final Office Action dated Sep. 13, 2022, U.S. Appl. No. 16/722,580, filed Dec. 20, 2019.

Non-final Office Action dated Sep. 15, 2022, U.S. Appl. No. 16/901,302, filed Jun. 15, 2020.

\* cited by examiner

ACCELERATING SPARSE MATRIX MULTIPLICATION IN STORAGE CLASS MEMORY-BASED CONVOLUTIONAL NEURAL NETWORK INFERENCE

BACKGROUND

Artificial neural networks are finding increasing usage in artificial intelligence and machine learning applications. In an artificial neural network, a set of inputs is propagated through one or more intermediate, or hidden, layers to generate an output. The layers connecting the input to the output are connected by sets of weights that are generated in a training or learning phase by determining a set of a mathematical manipulations to turn the input into the output, moving through the layers calculating the probability of each output. Once the weights are established, they can be used in the inference phase to determine the output from a set of inputs. Although such neural networks can provide highly accurate results, they are extremely computationally intensive, and the data transfers involved in reading the weights connecting the different layers out of memory and transferring them into the processing units of a processing unit can be quite intensive.

BRIEF DESCRIPTION OF THE DRAWING

Like-numbered elements refer to common components in the different figures.

DETAILED DESCRIPTION

When a convolution neural network (CNN) performs an inference operation, the most time consuming parts of the inference are the convolution operations as these are very computationally intensive matrix multiplication operations using large amounts of data. The convolutions, or matrix multiplications, are performed using sets of weights, referred to as filters, determined during a training process for the CNN. To accelerate the convolution operations and reduce the amount of data that needs to be transferred in order to perform them, the filters can be stored in the memory cells of a non-volatile storage class memory (SCM), such as ReRAM or a phase change memory based array, and the matrix multiplication can be performed as an in-memory operation on the memory chip.

In a CNN, the filters are often "sparse", in that they have a large number of zero entries. When a filter is sparse, the output of parts of a multiplication operation will often be zero independently of the input. Consequently, if the presence and location of all-zero columns or all-zero rows in a filter is known, the multiplication operations for these columns or rows can be skipped. The following presents techniques that allow for in-memory matrix multiplication operations in which the multiplications involving all-zero columns or all-zero rows are skipped, resulting in improved performance and reduced power consumption.

More specifically, a zero column index, a zero row index, or both associated with the SCM array is introduced. These indices are a vector of values that can be stored in a register on the memory device and indicate the presence of an all-zero columns or all-zero rows. When accessing the array in a column oriented matrix multiplication operation, if the zero column index indicates that a column contains only zero valued weights, the corresponding bit line is not accessed. When accessing the array in a row oriented matrix multiplication operation, if the zero row index indicates that a row contains only zero valued weights, the corresponding word line is not accessed. In the case of a sparse filter, the ability to skip these access operations can significantly reduce both the time and power used in the inference.

Figure 1:
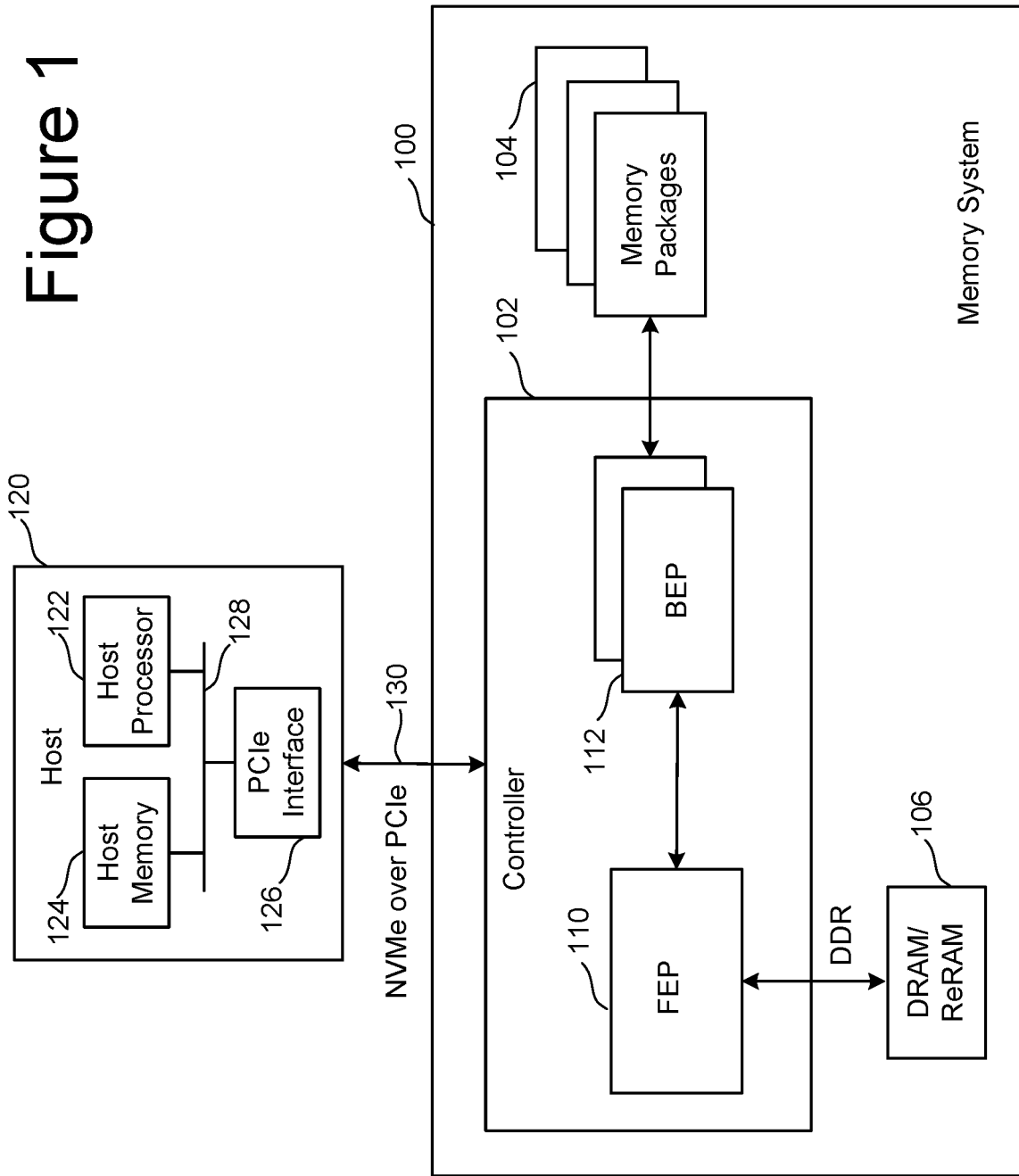
FIG. 1 is a block diagram of one embodiment of a memory system connected to a host.

FIG. 1 is a block diagram of one embodiment of a memory system 100 connected to a host 120. Memory system 100 can implement the technology proposed herein, where the neural network inputs or other data are received from the host 120. Depending on the embodiment, the inputs can be received from the host 120 and then provided to the memory packages 104 for inferencing on the weights previously programmed into the memory arrays of the memory packages 104. Many different types of memory systems can be used with the technology proposed herein. Example memory systems include solid state drives ("SSDs"), memory cards and embedded memory devices; however, other types of memory systems can also be used.

Memory system 100 of FIG. 1 comprises a Controller 102, non-volatile memory 104 for storing data, and local memory (e.g. DRAM/ReRAM) 106. Controller 102 comprises a Front End Processor (FEP) circuit 110 and one or more Back End Processor (BEP) circuits 112. In one embodiment FEP circuit 110 is implemented on an ASIC. In one embodiment, each BEP circuit 112 is implemented on a separate ASIC. In other embodiments, a unified controller ASIC can combine both the front end and back end functions. The ASICs for each of the BEP circuits 112 and the FEP circuit 110 are implemented on the same semiconductor such that the Controller 102 is manufactured as a System on a Chip ("SoC"). FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Flash Translation Layer (FTL) or Media Management Layer (MML) that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, Controller 102 is connected to one or more non-volatile memory die. In one embodiment, each memory die in the memory packages 104 utilize NAND flash memory (including two dimensional NAND flash memory and/or three dimensional NAND flash memory). In other embodiments, the memory package can include other types of memory.

Controller 102 communicates with host 120 via an interface 130 that implements NVM Express (NVMe) over PCI Express (PCIe). For working with memory system 100, host 120 includes a host processor 122, host memory 124, and a PCIe interface 126 connected along bus 128. Host memory 124 is the host's physical memory, and can be DRAM, SRAM, non-volatile memory or another type of storage. Host 120 is external to and separate from memory system 100. In one embodiment, memory system 100 is embedded in host 120.

Figure 2:
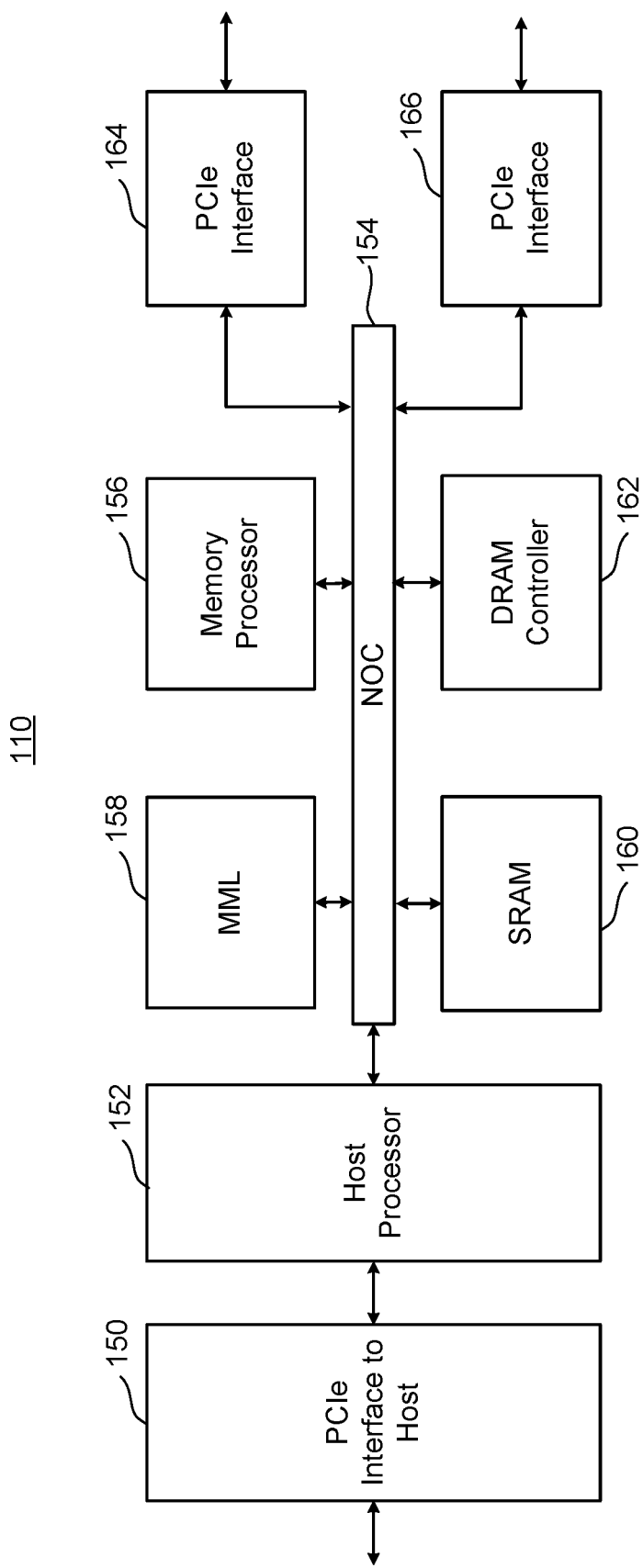
FIG. 2 is a block diagram of one embodiment of a Front End Processor Circuit. In some embodiments, the Front End Processor Circuit is part of a Controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FEP circuit 110 can also include a Flash Translation Layer (FTL) or, more generally, a Media Management Layer (MML) 158 that performs memory management (e.g., garbage collection, wear leveling, load balancing, etc.), logical to physical address translation, communication with the host, management of DRAM (local volatile memory) and management of the overall operation of the SSD or other non-volatile storage system. The media management layer MML 158 may be integrated as part of the memory management that may handle memory errors and interfacing with the host. In particular, MML may be a module in the FEP circuit 110 and may be responsible for the internals of memory management. In particular, the MML 158 may include an algorithm in the memory device firmware which translates writes from the host into writes to the memory structure (e.g., 326 of FIG. 5 below) of a die. The MML 158 may be needed because: 1) the memory may have limited endurance; 2) the memory structure may only be written in multiples of pages; and/or 3) the memory structure may not be written unless it is erased as a block. The MML 158 understands these potential limitations of the memory structure which may not be visible to the host. Accordingly, the MML 158 attempts to translate the writes from host into writes into the memory structure.

Figure 3:
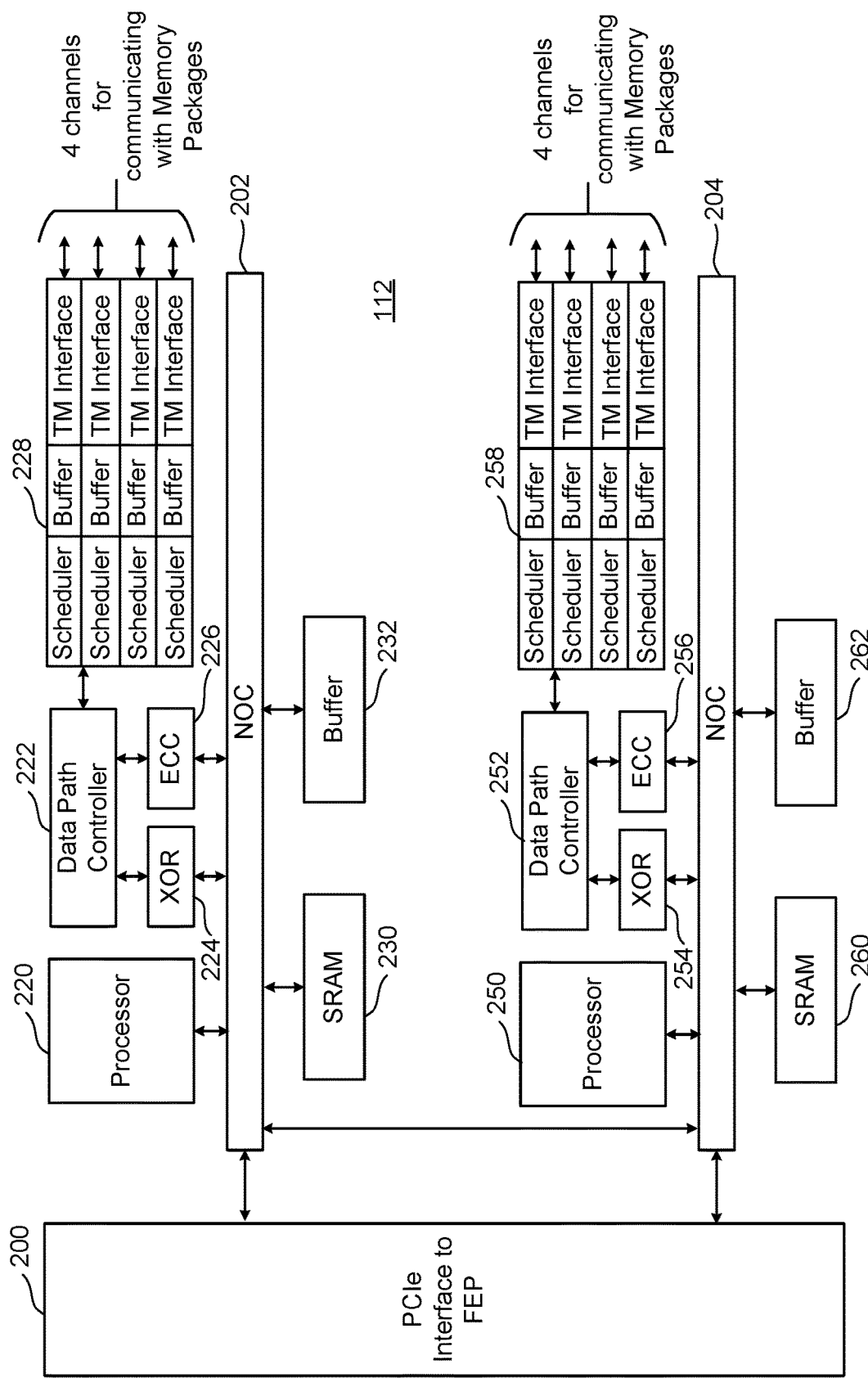
FIG. 3 is a block diagram of one embodiment of a Back End Processor Circuit. In some embodiments, the Back End Processor Circuit is part of a Controller.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 4:
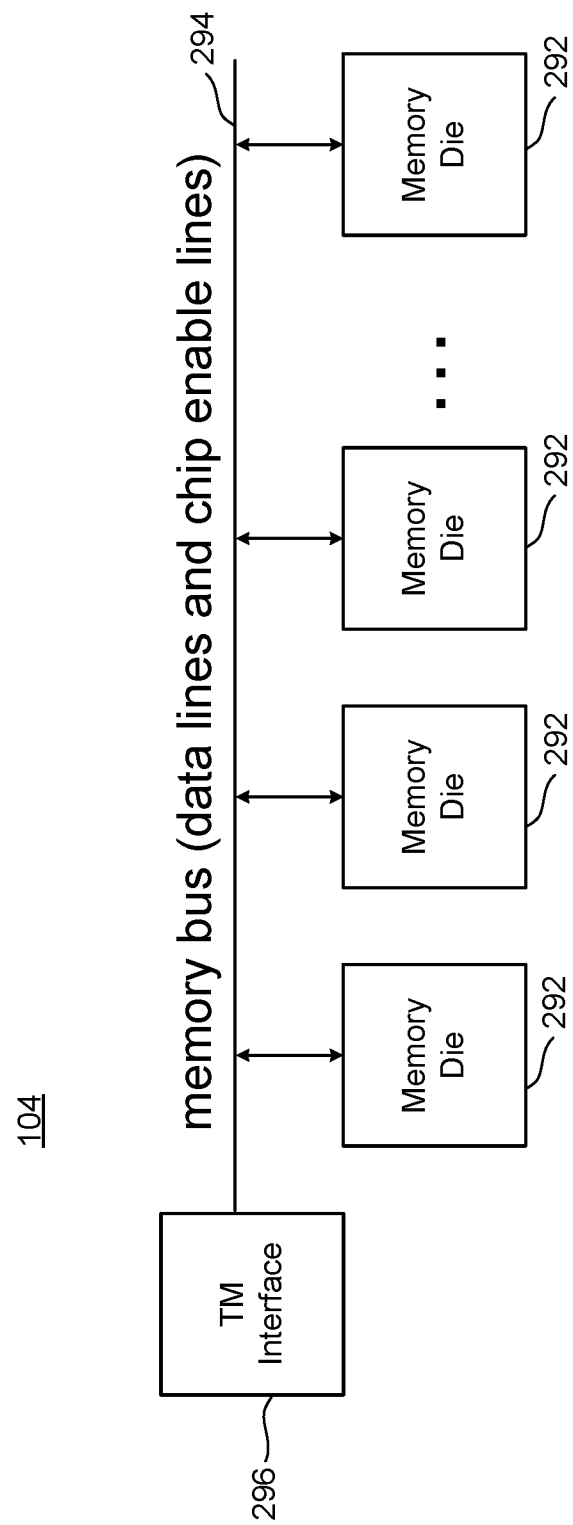
FIG. 4 is a block diagram of one embodiment of a memory package.

FIG. 4 is a block diagram of one embodiment of a memory package 104 that includes a plurality of memory die 292 connected to a memory bus (data lines and chip enable lines) 294. The memory bus 294 connects to a Toggle Mode Interface 296 for communicating with the TM Interface of a BEP circuit 112 (see e.g., FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 5:
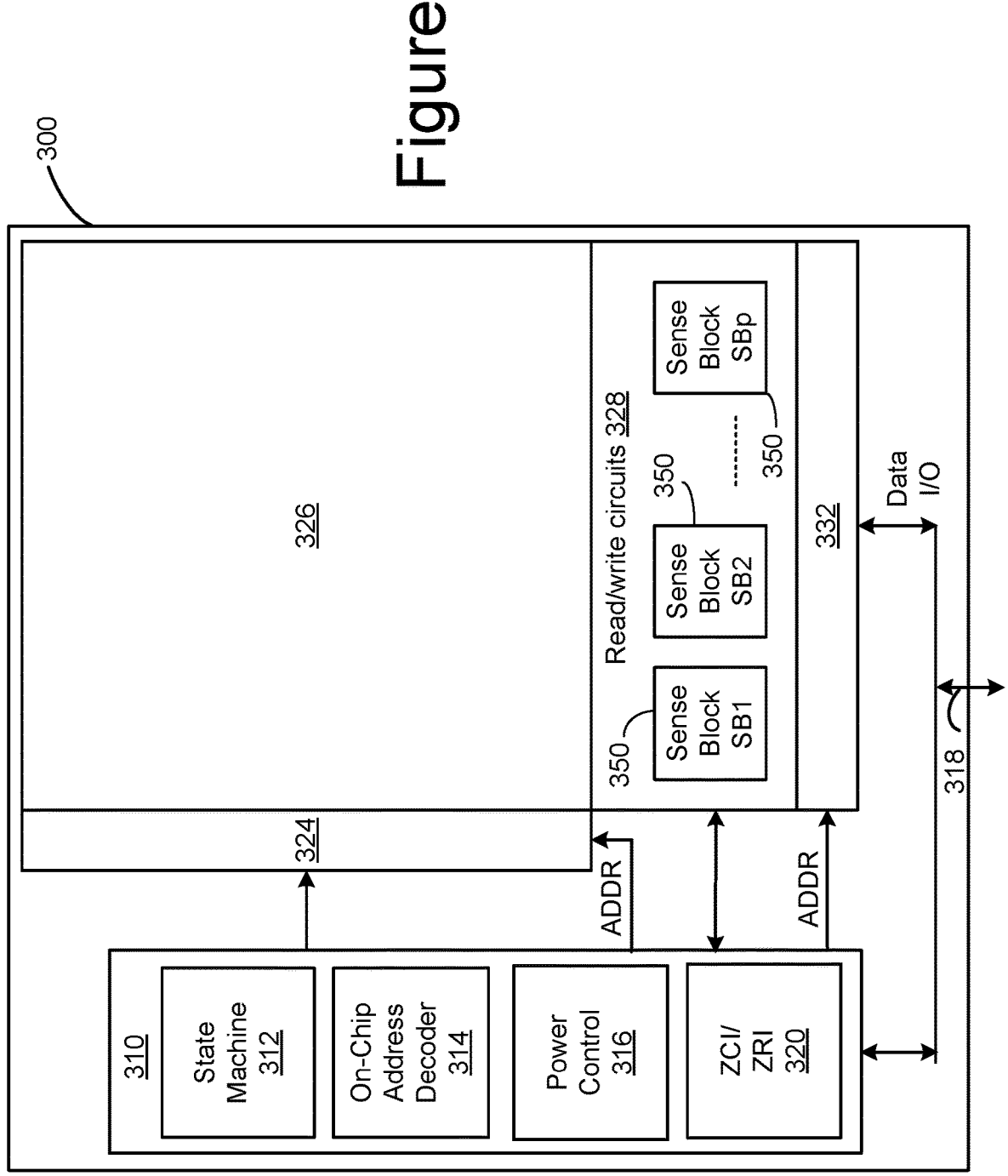
FIG. 5 is a block diagram of one embodiment of a memory die.

FIG. 5 is a functional block diagram of one embodiment of a memory die 300. The components depicted in FIG. 5 are electrical circuits. In one embodiment, each memory die 300 includes a memory structure 326, control circuitry 310, and read/write circuits 328. Memory structure 126 is addressable by word lines via a row decoder 324 and by bit lines via a column decoder 332. The read/write circuits 328 include multiple sense blocks 350 including SB1, SB2, SBp (sensing circuitry) and allow a page of memory cells to be read or programmed in parallel. Commands and data are transferred between the Controller and the memory die 300 via lines 318. In one embodiment, memory die 300 includes a set of input and/or output (I/O) pins that connect to lines 318.

Control circuitry 310 cooperates with the read/write circuits 328 to perform memory operations (e.g., write, read, and others) on memory structure 326, and includes a state machine 312, an on-chip address decoder 314, a power control circuit 316, and a zero-column/zero-row index register ZCI/ZRI 320. State machine 312 provides die-level control of memory operations. In one embodiment, state machine 312 is programmable by software. In other embodiments, state machine 312 does not use software and is completely implemented in hardware (e.g., electrical circuits). In another embodiment, state machine 312 is replaced by a micro-controller. In one embodiment, control circuitry 310 includes buffers such as registers, ROM fuses and other storage devices for storing default values such as base voltages and other parameters.

The on-chip address decoder 314 provides an address interface between addresses used by Controller 102 to the hardware address used by the decoders 324 and 332. Power control module 316 controls the power and voltages supplied to the word lines and bit lines during memory operations. Power control module 316 may include charge pumps for creating voltages. The sense blocks include bit line drivers.

The use of the zero-column/zero-row index register ZCI/ZRI 320 can be part of a general set of registers or a set of purpose specific registers that can be used for maintaining information of on array columns, array rows, or both that hold all zero entries. The use of this register will be discussed further with respect to the inference process in convolutional neural networks with sparse weight values.

For purposes of this document, the phrase "one or more control circuits" can refer to a controller, a state machine, a micro-controller and/or control circuitry 310, or other analogous circuits that are used to control non-volatile memory.

In one embodiment, memory structure 326 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping material such as described, for example, in U.S. Pat. No. 9,721,662, incorporated herein by reference in its entirety.

In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 326 include ReRAM memories (resistive random access memories), magnetoresistive memory (e.g., MRAM, Spin Transfer Torque MRAM, Spin Orbit Torque MRAM), phase change memory (e.g., PCM), and the like. Examples of suitable technologies for memory cell architectures of the memory structure 126 include two dimensional arrays, three dimensional arrays, cross-point arrays, stacked two dimensional arrays, vertical bit line arrays, and the like.

One example of a ReRAM, or PCM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Turning now to types of data that can be stored on non-volatile memory devices, a particular example of the type of data of interest in the following discussion is the weights used is in convolutional neural networks, or CNNs. The name "convolutional neural network" indicates that the network employs a mathematical operation called convolution, that is a specialized kind of linear operation. Convolutional networks are neural networks that use convolution in place of general matrix multiplication in at least one of their layers. A CNN is formed of an input and an output layer, with a number of intermediate hidden layers. The hidden layers of a CNN are typically a series of convolutional layers that "convolve" with a multiplication or other dot product. Though the layers are commonly referred to as convolutions, technically these are often a sliding dot product or cross-correlation, such as discussed below with respect to FIG. 8.

Each neuron in a neural network computes an output value by applying a specific function to the input values coming from the receptive field in the previous layer. The function that is applied to the input values is determined by a vector of weights and a bias. Learning, in a neural network, progresses by making iterative adjustments to these biases and weights. The vector of weights and the bias are called filters and represent particular features of the input (e.g., a particular shape). A distinguishing feature of CNNs is that many neurons can share the same filter.

Figure 6:
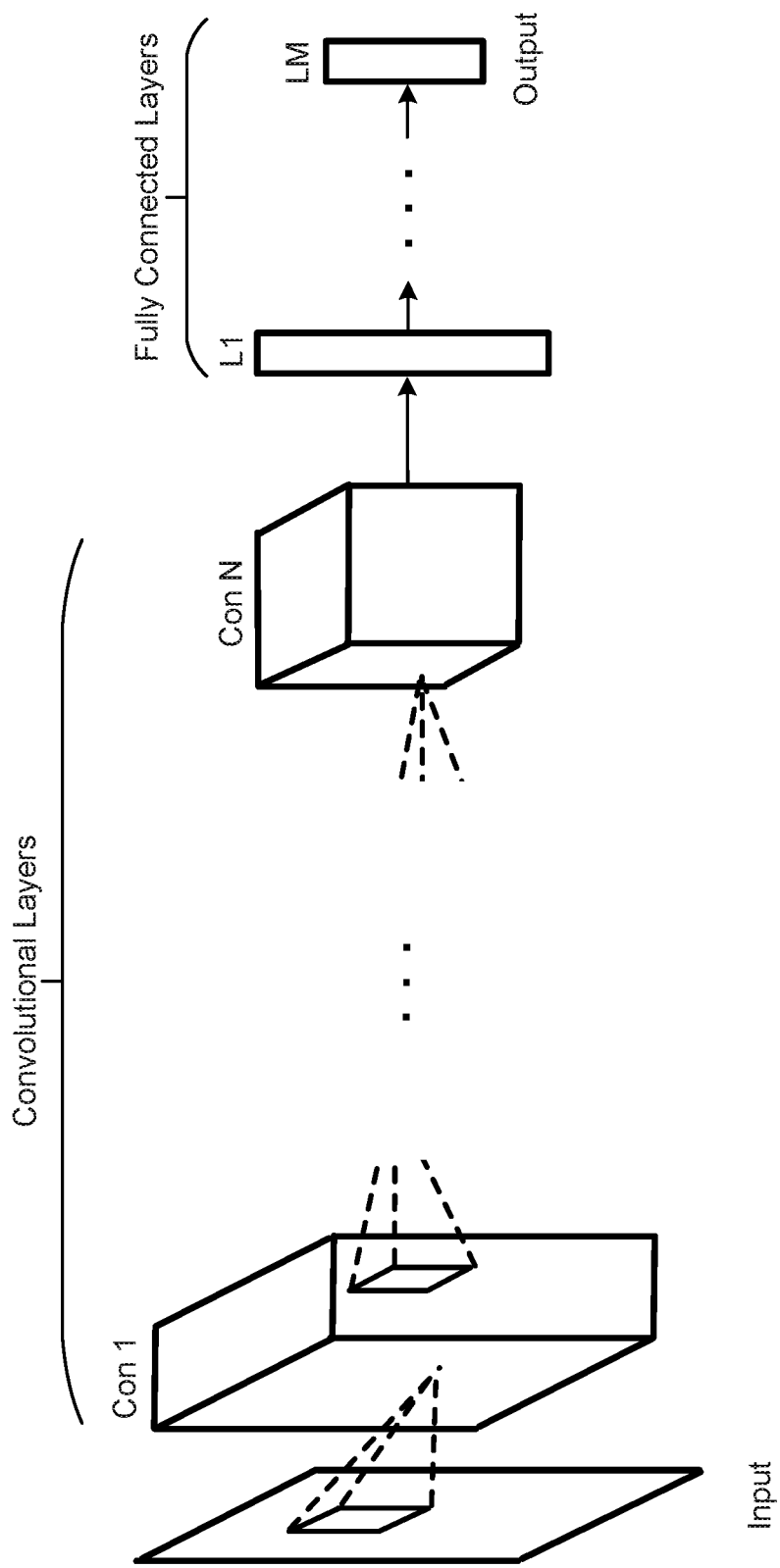
FIG. 6 illustrates a simple example of a convolutional neural network (CNN).

FIG. 6 is a schematic representation of an example of a CNN. Starting from an input image of an array of pixel values, followed by a number convolutional layers, that are in turn followed by a number of fully connected layers, the last of which provides the output. Each neuron in the first convolutional layer takes as input data from an n×n pixel sub-region of the input image. The neuron's learned weights, which are collectively referred to as its convolution filter, determine the neuron's single-valued output response to the input. In the convolution, a neuron's filter is applied to the input image by sliding the input region along the image's x and y dimensions to generate the values of the convolutional layer. In practice, the equivalent convolution is normally implemented by statically identical copies of the neuron to different input regions. The process is repeated through the convolutional layer using each layers learned weights, after which it is propagated through fully connected layers using their learned weights.

A supervised artificial neural network is "trained" by supplying inputs and then checking and correcting the outputs. For example, a neural network that is trained to recognize dog breeds will process a set of images and calculate the probability that the dog in an image is a certain breed. A user can review the results and select which probabilities the network should display (above a certain threshold, etc.) and return the proposed label. Each mathematical manipulation as such is considered a layer, and complex neural networks have many layers. Due to the depth provided by a large number of intermediate or hidden layers, neural networks can model complex non-linear relationships as they are trained.

Figure 7B:
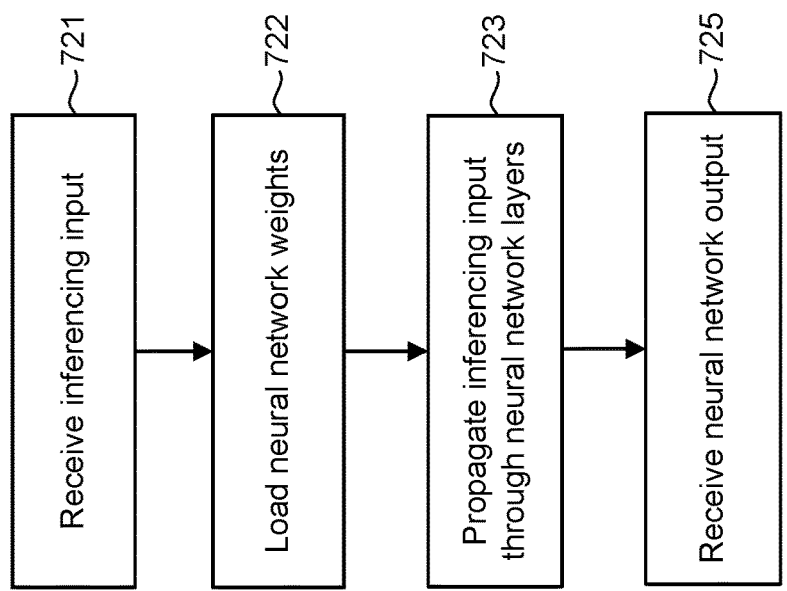
FIG. 7B is a flowchart describing one embodiment of a process for inference using a neural network.
Figure 7A:
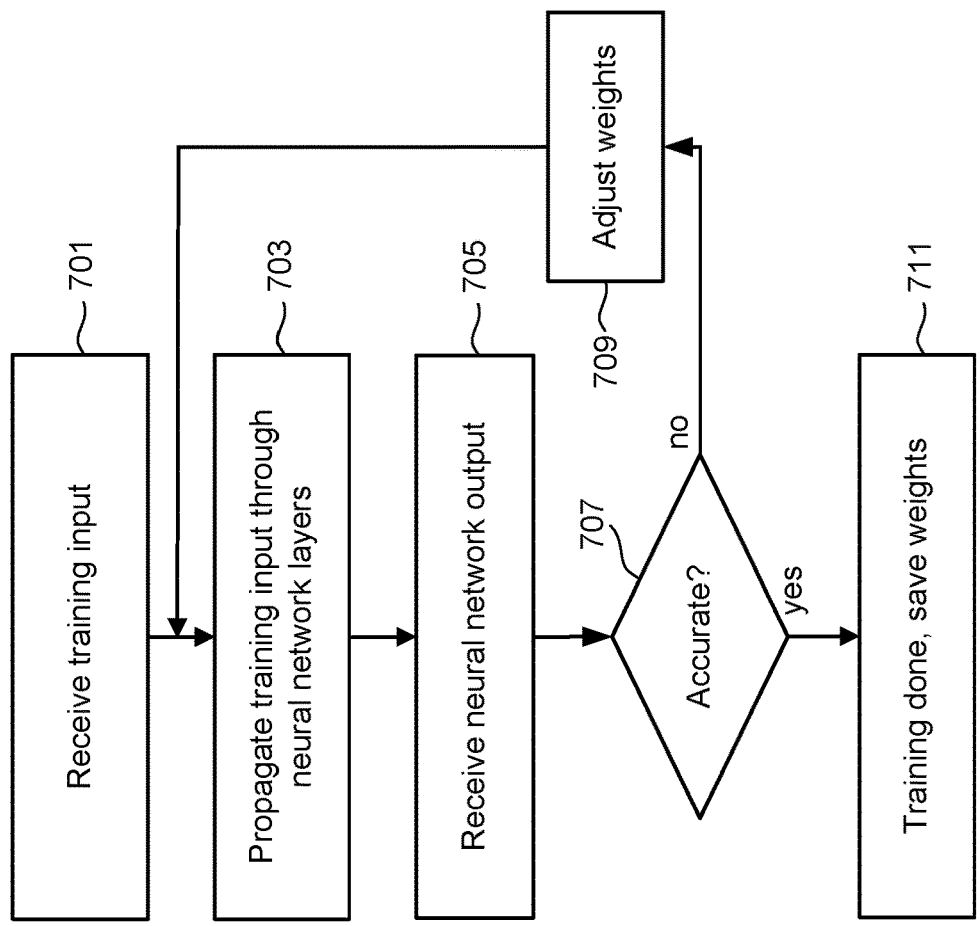
FIG. 7A is a flowchart describing one embodiment of a process for training a neural network to generate a set of weights.

FIG. 7A is a flowchart describing one embodiment of a process for training a neural network to generate a set of weights. The training process is often performed in the cloud, allowing additional or more powerful processing the accessed. At step 701, the input, such as a set of images, is received at the input (e.g., the image input in FIG. 6). At step 703 the input is propagated through the layers connecting the input to the next layer (e.g., CON1 in FIG. 6) using the current filter, or set of weights. The neural network's output is then received at next layer (e.g., CON2 in in FIG. 6) in step 705, so that the values received as output from one layer serve as the input to the next layer. The inputs from the first layer are propagated in this way through all of the intermediate or hidden layers until they reach the output. In a dog breed example of the preceding paragraph, the input would be the image data of a number of dogs, and the intermediate layers use the current weight values to calculate the probability that the dog in an image is a certain breed, with the proposed dog breed label returned at step 705. A user can then review the results at step 707 to select which probabilities the neural network should return and decide whether the current set of weights supply a sufficiently accurate labelling and, if so, the training is complete (step 711). If the result is not sufficiently accurate, the neural network adjusts the weights at step 709 based on the probabilities the user selected, followed by looping back to step 703 to run the input data again with the adjusted weights. Once the neural network's set of weights have been determined, they can be used to "inference," which is the process of using the determined weights to generate an output result from data input into the neural network. Once the weights are determined at step 711, they can then be stored in non-volatile memory for later use, where the storage of these weights in non-volatile memory is discussed in further detail below.

FIG. 7B is a flowchart describing a process for the inference phase of supervised learning using a neural network to predict the "meaning" of the input data using an estimated accuracy. Depending on the case, the neural network may be inferenced both in the cloud and by an edge device's (e.g., smart phone, automobile process, hardware accelerator) processor. At step 721, the input is received, such as the image of a dog in the example used above. If the previously determined weights are not present in the device running the neural network application, they are loaded at step 722. For example, on a host processor executing the neural network, the weight could be read out of an SSD in which they are stored and loaded into RAM on the host device. At step 723, the input data is then propagated through the neural network's layers. Step 723 will be similar to step 703 of FIG. 7B, but now using the weights established at the end of the training process at step 711. After propagating the input through the intermediate layers, the output is then provided at step 725.

Figure 8:
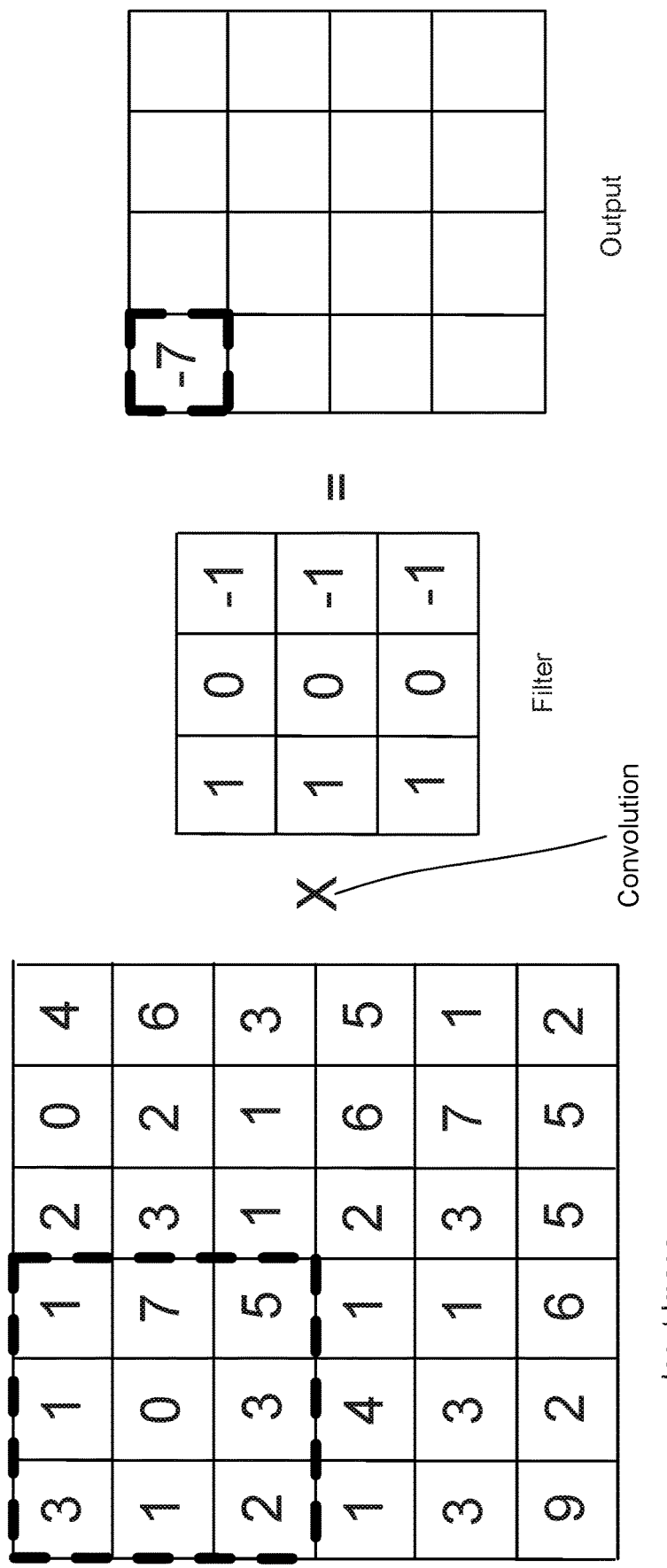
FIG. 8 is a schematic representation of a convolution operation in a convolutional neural network.

FIG. 8 is a schematic representation of a convolution operation between an input image and filter, or set of weights. In this example, the input image is a 6×6 array of pixel values and the filter is a 3×3 array of weights. The convolution operation is performed by a matrix multiplication the 3×3 filter with 3×3 blocks of the input image. For example, the multiplication of the upper-left most 3×3 block of the image with the filter results in the top left value of the output matrix. The filter can then be slid across by one pixel on the image to generate the next entry of the output, and so on to generate a top row of 4 elements for the output. By repeating this by sliding the filter down a pixel at a time, the 4×4 output matrix is generated. Similar operations are performed for each of the layers. In a real CNN, the size of the data sets and the number of convolutions performed mean that extremely large numbers of such operations are performed involving very large amounts of data.

CNN inference is heavily based on the Matrix Multiplication (MM) of activation, or input value, and weight. Both activation and weight matrixes, or filters, can be highly "sparse". A matrix is sparse when it has a high number of 0 entries. Sparsity can occur as part of the training process for determining the filters, but can also arise from pruning in the training phase, where pruning is performed to avoid overfitting, to simplify the model, and improve performance. Activation sparsity can be due to fixed or dynamic image patterns (i.e. depending on algorithm itself).

Although it can provide advantages, sparsity can lead to inefficiency in the CNN inference process. For example, performing of arithmetic executions with zero valued weights can result in energy inefficiency, and the storing of zero weights leads to non-utilized memory. One technique for storing CNN filters and implementation of convolution operations is through use of storage class memory, or SCM. However, conventional storage class memory is not optimized for the sparse matrix multiplication with mixed zero and non-zero weights and/or activations. A SCM array can naturally offer a high degree of parallelism in both a column-oriented and a row-oriented mode to accelerate the performance of matrix multiplication in general. However, it cannot eliminate the cost to access zero weights (and/or activations).

Figure 9:
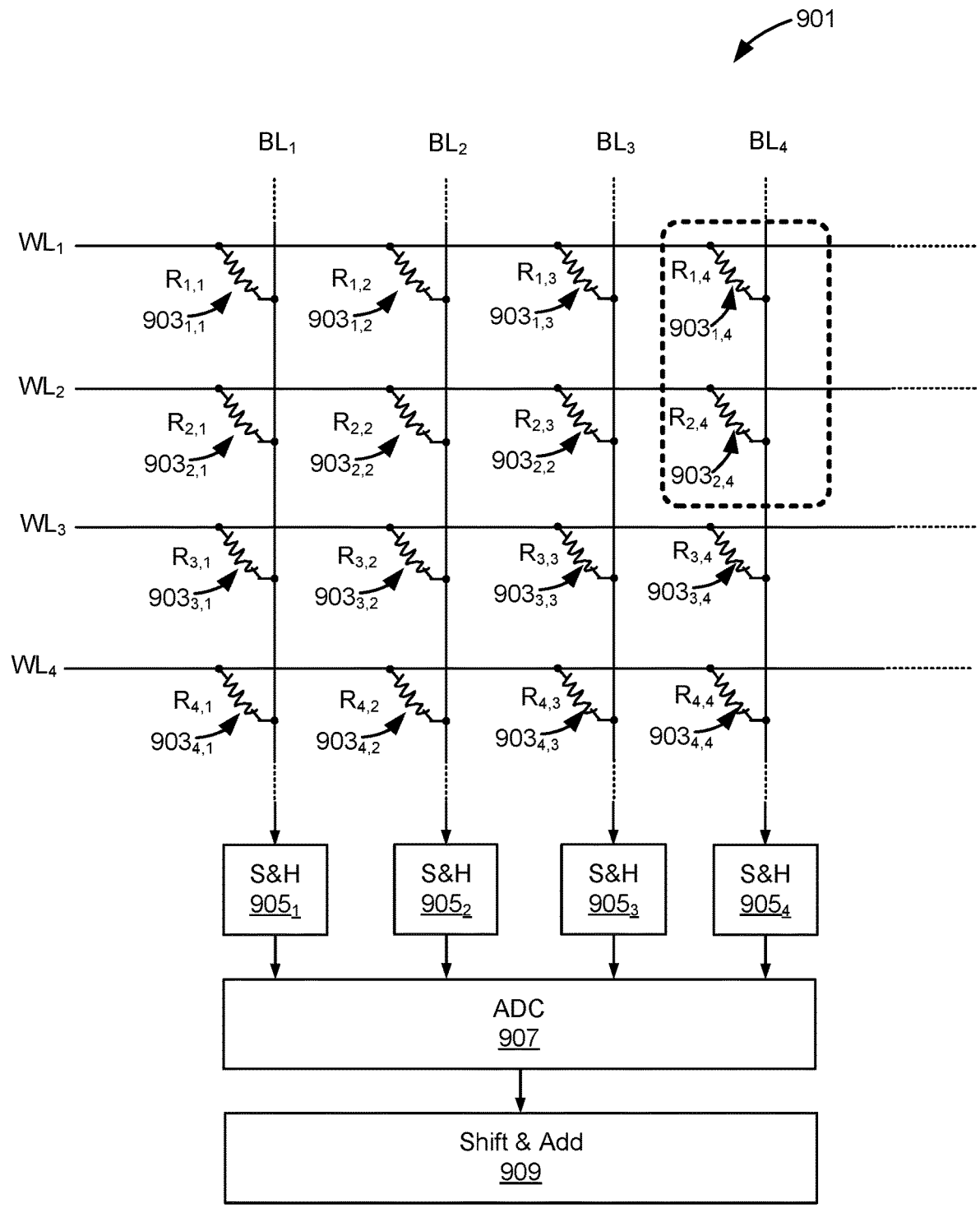
FIGS. 9 and 10 illustrate the use of storage class memory for implementing in-array matrix multiplication.
Figure 10:
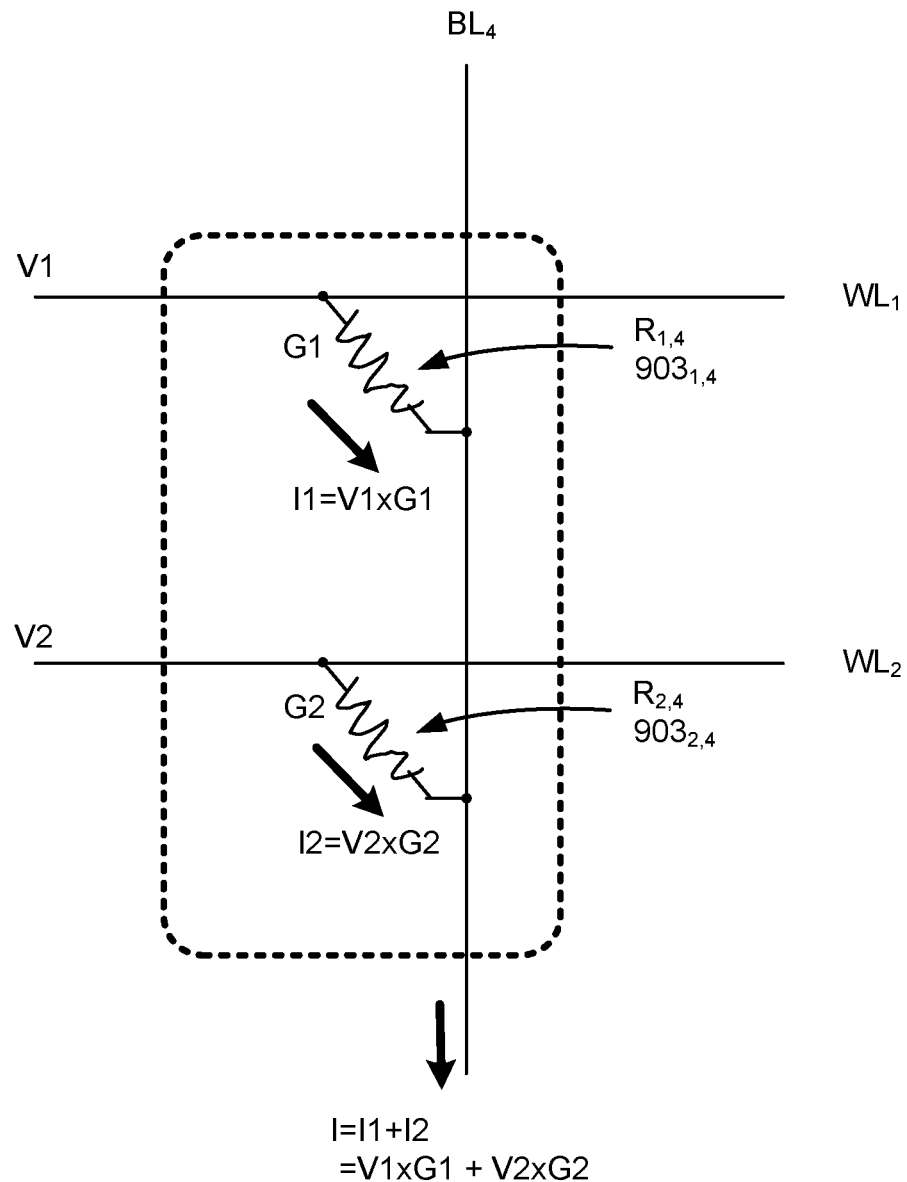

FIGS. 9 and 10 illustrate the use of storage class memory for implementing in-array matrix multiplication. In FIG. 9, the memory structure 901 is a portion of a storage class memory, such as ReRAM, PCM or other resistive non-volatile memory, that can correspond to a 4×4 section of the memory structure 326 of FIG. 1. A memory cell resistive memory cell $R_{i,j}$ 903$_{i,j}$ is connected between word line $WL_i$ and bit line $BL_j$. The inputs are applied as voltage levels to the word lines and the individual weights are stored as a resistance level on a resistor, so that when a voltage is applied to a word line a current will flow through a resistor to the bit lines, where the current can be sensed. In FIG. 9, the sensing circuitry is represented by the sample and hold circuit S&H$_j$ 905$_j$ along bit line $BL_j$. For example, the sample and hold circuits can use current based sensing to provide an analog output, and are in turn connected to an analog to digital converter ADC 907. As shift and add circuit 909 is used to perform accumulation operations from the values received from the ADC 907. Depending on the embodiment, the input and weight values can be binary or multi-state.

FIG. 10 illustrates the multiplication mechanism for the two circled memory, $R_{1,4}$ 903$_{1,4}$ and $R_{2,4}$ 903$_{2,4}$, of FIG. 9 in a vector-matrix multiplication. In the example of FIG. 10, memory cell $R_{1,4}$ 903$_{1,4}$ is programmed to have a conductance (i.e., inverse resistance) of $G_{1,4}$ and memory cell $R_{2,4}$ 903$_{2,4}$, is programmed to have a conductance of $G_{2,4}$. If a vector of input values, or "input vector", of voltages $(V_1, V_2)$ is applied to the word lines $WL_1$ and $WL_2$, the resultant current through the two memory cells will be $I_{1,4}=V_1 G_{1,4}$ and $I_{2,3}=V_2 G_{2,4}$ according to Ohm's law. The combined current on $BL_4$ is then $I_4=I_{1,4}+I_{2,3}=V_1 G_{1,4}+V_2 G_{2,4}$. Consequently, by applying a vector of input values of voltages on the word lines and accumulating the results from the bit lines, the output of the shift and add circuit 909 the result of an input vector-weight matrix (or filter) multiplication. An input, or activation, matrix can be applied a column at a time, with the results accumulated, to provide the matrix multiplications to obtain the output matrix. This SCM-based in-array technique can accelerate matrix multiplication and be performed in a column-oriented mode, in which (one or several group of) word lines are activated in parallel and bit lines are sequentially accessed to read out data, or in a row-oriented mode, in which (one or several groups of) bit lines are activated in parallel and word lines are sequentially charged to read out data FIG. 9 represents the memory structure 326, of which the portion 901 forms a portion, as a two dimensional array. The embodiments described below of architectures for the leveraging of all-zero rows or columns will also be represented in a planar, two dimensional figure; however, the embodiments presented below can also be implemented in three dimensional array structures, such as illustrated in FIGS. 11 and 12.

Figure 11:
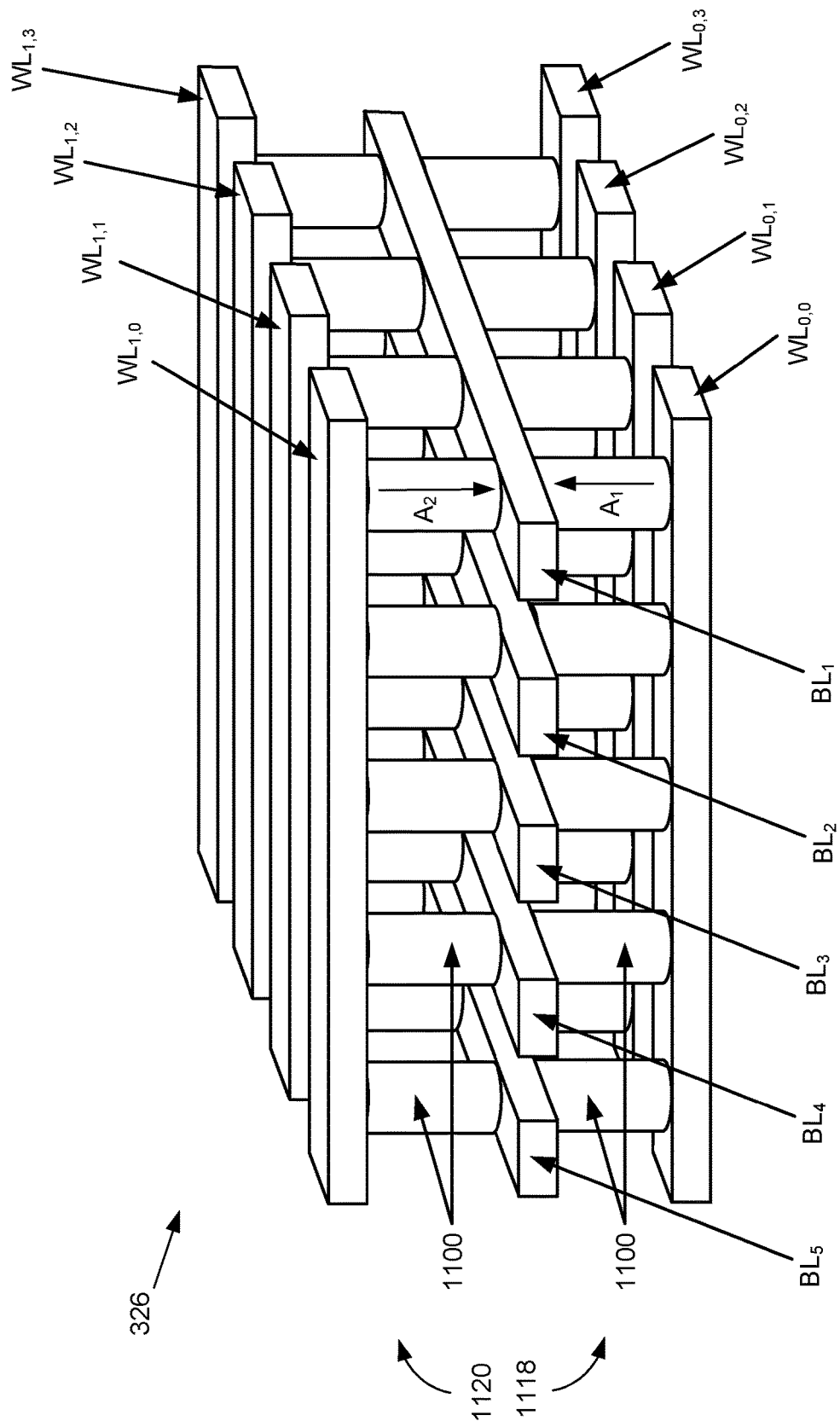
FIG. 11 depicts one embodiment of a portion of a monolithic three-dimensional memory array that forms a differential cross-point (DX) architecture.

FIG. 11 depicts one embodiment of a portion of a monolithic three-dimensional memory array 326 that forms a differential cross-point (DX) architecture that includes a second memory level 1120 positioned above a first memory level 1118. Memory array 326 is one example of an implementation for memory array 326 in FIG. 5. The bit lines $BL_1$-$BL_5$ are arranged in a first direction (represented as running into the page) and the word lines $WL_{0,1}$-$WL_{0,4}$ and $WL_{1,1}$-$WLB_{1,4}$ are arranged in a second direction perpendicular to the first direction. FIG. 11 is an example of a horizontal cross-point structure in which word lines $WL_{0,1}$-$WL_{0,4}$ and $WL_{1,1}$-$WLB_{1,4}$ and $BL_1$-$BL_5$ both run in a horizontal direction relative to the substrate, while the memory cells 1100 are oriented so that the current runs in the vertical direction. As depicted, the upper conductors of first memory level 1118 may be used as the lower conductors of the second memory level 1120 that is positioned above the first memory level. In a memory array with additional layers of memory cells, there would be corresponding additional layers of bit lines and word lines.

As depicted in FIG. 11, memory array 326 includes a plurality of memory cells 1100. The memory cells 1100 may include re-writeable memory cells, such as can be implemented using ReRAM, MRAM, PCM, or other material with a programmable resistance. With respect to first memory level 1118, a first portion of memory cells 1100 are between and connect to bit lines $BL_1$-$BL_5$ and word lines $WL_{0,1}$-$WL_{0,4}$. With respect to second memory level 1120, a second portion of memory cells 1100 are between and connect to bit lines $BL_1$-$BL_5$ and word lines $WL_{1,1}$-$WLB_{1,4}$. The current in the memory cells of the first memory level 1118 may flow upward as indicated by arrow $A_1$, while the current flowing in memory cells of the second memory level 1120 may flow downward as indicated by arrow $A_2$.

Figure 12:
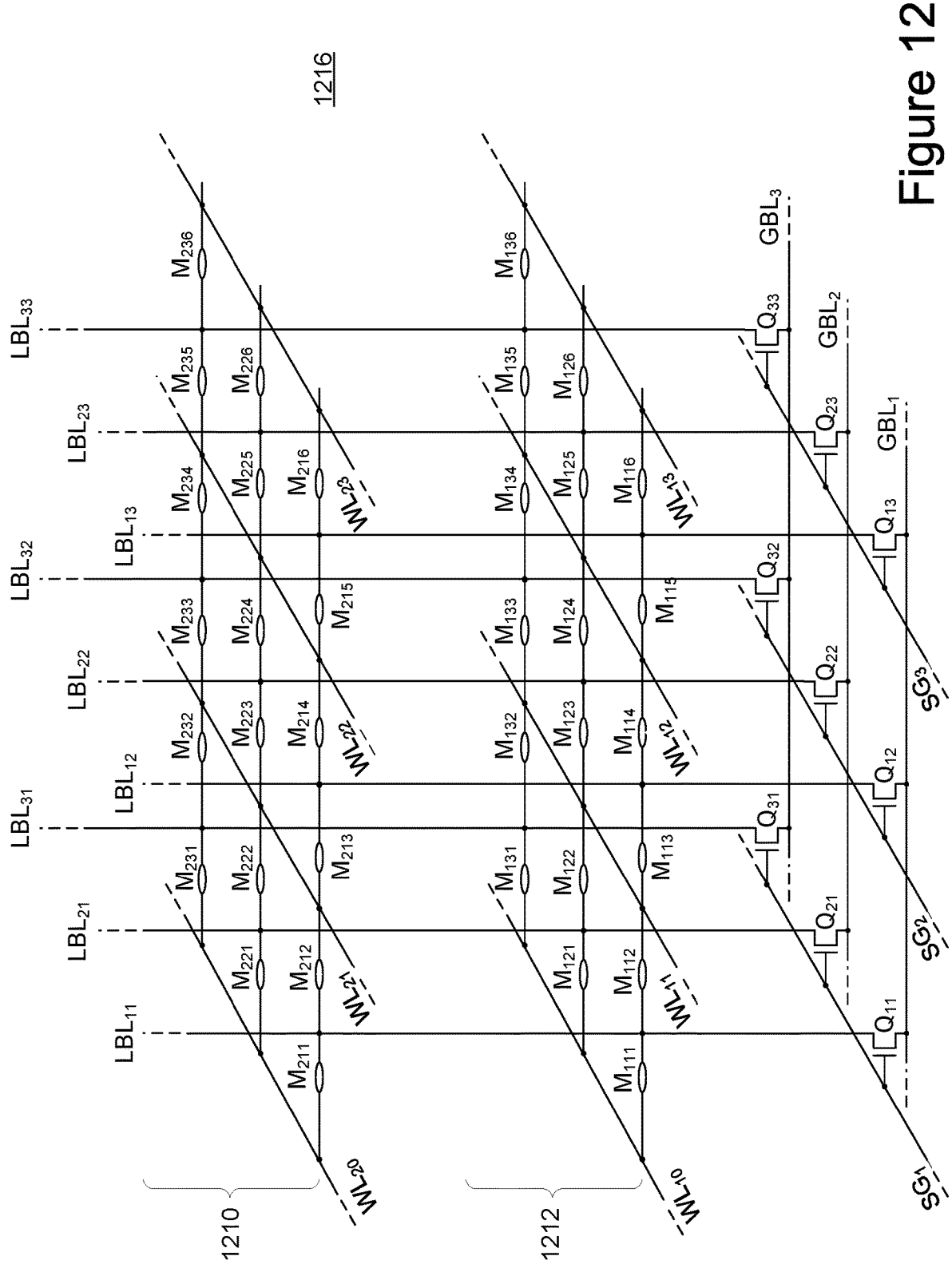
FIG. 12 provides an embodiment using an extended three dimensional structure for the storage of neural network weights.

FIG. 12 depicts one embodiment of a portion of a monolithic three-dimensional memory array 1216 that includes a first memory level 1212 positioned below a second memory level 1210. The architecture of FIG. 12 provides another example of an embodiment that can be used for the storage of neural network weights, in this case using an extended three dimensional structure. Memory array 1216 is one example of an implementation for memory array 326 in FIG. 5. As depicted, the local bit lines $LBL_{11}$-$LBL_{33}$ are arranged in a first direction (i.e., a vertical direction) and the word lines $WL_{10}$-$WL_{23}$ are arranged in a second direction perpendicular to the first direction. This arrangement of vertical bit lines in a monolithic three-dimensional memory array is one embodiment of a vertical bit line memory array. As depicted, disposed between the intersection of each local bit line and each word line is a particular memory cell (e.g., memory cell Min is disposed between local bit line $LBL_{11}$ and word line $WL_{10}$). This structure can be used with a number of different memory cell structures. In one example, the particular memory cell may include a floating gate device or a charge trap device (e.g., using a silicon nitride material). In another example, the particular memory cell may include a reversible resistance-switching material, a metal oxide, a phase change memory material, a ReRAM material, an MRAM material, or a PCM material. The global bit lines $GBL_1$-$GBL_3$ are arranged in a third direction that is perpendicular to both the first direction and the second direction. A set of bit line select devices (e.g., $Q_{11}$-$Q_{31}$), such as a vertical thin film transistor (VTFT), may be used to select a set of local bit lines (e.g., $LBL_{11}$-$LBL_{31}$). As depicted, bit line select devices $Q_{11}$-$Q_{31}$ are used to select the local bit lines $LBL_{11}$-$LBL_{31}$ and to connect the local bit lines $LBL_{11}$-$LBL_{31}$ to the global bit lines $GBL_1$-$GBL_3$ using row select line $SG_1$. Similarly, bit line select devices $Q_{12}$-$Q_{32}$ are used to selectively connect the local bit lines $LBL_{12}$-$LBL_{32}$ to the global bit lines $GBL_1$-$GBL_3$ using row select line $SG_2$ and bit line select devices $Q_{13}$-$Q_{33}$ are used to selectively connect the local bit lines $LBL_{13}$-$LBL_{33}$ to the global bit lines $GBL_1$-$GBL_3$ using row select line $SG_3$.

Returning to the discussion of convolutional neural networks and sparsity, in a typical CNN the convolutional operations consume the largest proportion of the computational time, typically dominating the total runtime of a CNN inference. All-zero rows and all-zero columns frequently occur in convolutional layers, with their number increased through the use of pruning algorithms that increase the all-zero weight rows and columns ratios in order to reduce overfitting, simplify models and improve performance. For example, in some applications the sparsity of some convolutional layers can approach or exceed 80%.

Figure 13:
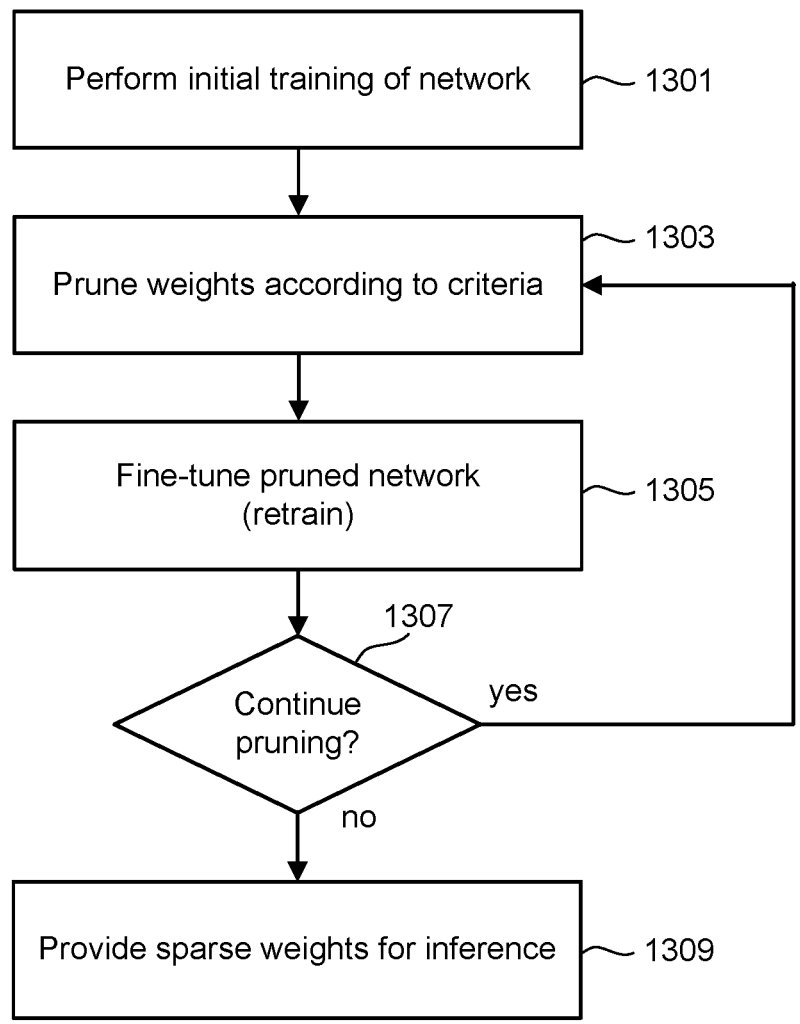
FIG. 13 is flowchart describing one embodiment of a process for pruning of a convolutional neural network.

FIG. 13 is flowchart describing one embodiment of a process for pruning of a convolutional neural network. The process begins with an initial training at step 1301, such as described above with respect to FIG. 7A. The pruning occurs at step 1303, where weights can be pruned according to one or more criteria. A number of pruning techniques based on various cost functions to remove weights in order to minimize cost under accuracy reduction constraints. At step 1305, fine-tuning is performed to retrain the network to recover the loss of classification accuracy due the pruning at step 1303. At step 1307, it is determined whether continue pruning and, if so, the flow loops back to step 1301. If the weights are determined to be sufficiently pruned, the sparse weight set for inferences is produced at step 1309 and can be used for CNN inference. In the embodiments presented below, the weights are written into one or more storage class memory arrays for use in in-array matrix multiplication operations, convoluting filters formed from the weights and the input of a preceding layer.

As noted above, in the CNN inferencing process the convolution operations consume the large majority of time in what can be a very time consuming process. When the weights have a high degree of sparsity, many or even most of the rows, columns, or both of a filter will be all zeros so that these computations will result in a zero output independently of input. Although the use of an in-array matrix multiplication can greatly accelerate the inferencing process, if these input independent zero output operations can be further accelerated, so that the inferencing process can be further accelerated. The following presents embodiments to leverage all-zero columns, all-zero rows, or both to accelerate the CNN inference process through use of a zero-column and/or zero-row index register, as illustrated in FIG. 5 at ZCI/ZRI 320. More specifically, FIGS. 14-16 respectively present embodiments of architectures that use a zero-column index vector to skip accessing of all-zero bit lines, a zero-row index vector to skip accessing of all-zero word lines, and support the use of both a zero-column index vector and a zero-row index vector.

Figure 14:
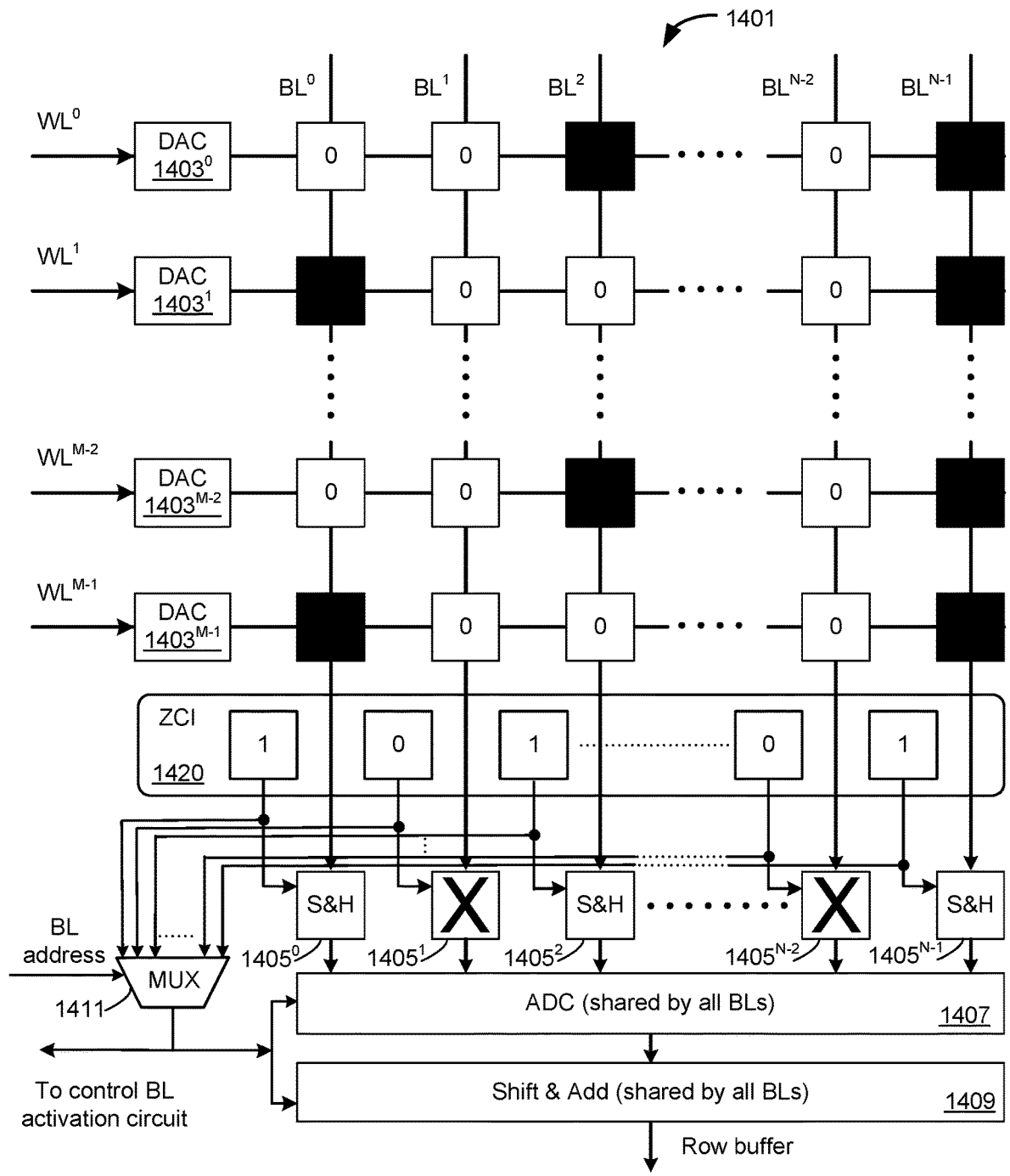
FIGS. 14-16 respectively present embodiments of architectures that use a zero-column index vector to skip accessing of all-zero bit lines, a zero-row index vector to skip accessing of all-zero word lines, and that support the use of both a zero-column index vector and a zero-row index vector.

FIG. 14 is an embodiment for an architecture that can leverage all-zero columns of a storage class memory subarray to reduce the number of bit line accesses to improve performance and energy efficiency. FIG. 14 illustrates an array, or portion of an array, 1401 of resistive non-volatile memory cells and peripheral elements, similar to the portions of the array shown in FIG. 9, but with the memory cells represented as blocks at the intersection of word lines and bit lines. N bit lines, running from $BL^0$ to $BL^{N-1}$, and M word lines, running from $WL^0$ to $WL^{M-1}$, are shown and can represent the whole of an array or a compact portion of a larger array. The memory cells have been written with a set of weights of a CNN to form a filter for use in a convolution. Depending on the embodiment, the weights can be binary, multi-level, or even analog. Similarly, the inputs can be binary, multi-level, or even analog. In any case, the weights are shown to have a fairly high degree of sparsity, where zero weights are represented as having a "0" in the corresponding block and non-zero weights have their corresponding block shaded. In FIG. 14, the columns corresponding to $BL^1$ and $BL^{N-2}$ are all-zero columns, so that for any input values, the output along the bit line will be zero.

The input to the array 1401 is applied to the word lines $WL^0$-$WL^{M-1}$. In FIG. 14, the word line drivers and decoder circuitry are represented by the digital to analog converters DAC 1403, which translate a digital value from vector of input values into an analog voltage. Based on the input vector values and the weights, an output current is generated along the bit lines as discussed above with respect to FIG. 10. The sensing circuitry for each bit line includes a sample and hold circuit S&H 1405 for each bit line, along with an analog to digital converter ADC 1407 (including sense amplifier) shared by all of the bit lines and a shift and add register 1409 that can also be shared by all of the bit lines. The output of the shift and add register 1409 is then transferred on to a row buffer (not shown in FIG. 14), from where it can be transferred on to the controller, be part of a process on the memory die, or both. The type of peripheral circuit elements (S&H 1405, DAC 1403, ADC 1407, shift and add register 1409) can be selected differentially depending upon specific design constraints of the embodiment.

In a column-oriented access, one or several groups of word lines are activated in parallel, with results along the bit line sequentially accessed and read out. For an all-zero column, however, as the result will be the same regardless of input, such an access can be skipped if the column is already known to be all-zero. For this purpose, a Zero Column Index (ZCI) 1420 is added at the array or sub-array level, adding one vector per array or sub-array. The size of the ZCI 1420 is the number of bit lines in the array or subarray 1401, which can be the same as the corresponding row buffer. Each bit line $BL^i$ has an entry in ZCI 1420 where, in this embodiment, $ZCI^i = $ '0' indicates the $i^{th}$ column having all-zero weights and $ZCI^i = $ '1' indicates the $i^{th}$ column having at least one non-zero weight. The entries of ZCI 1420 are connected to the corresponding S&H 1405, so that if the index ZCI=0 the corresponding S&H 1405 is de-activated (indicated by an X) and if the index ZCI=1 the corresponding S&H 1405 is activated. As illustrated for the example weights in FIG. 14, columns 1 and (N−2) have a ZCI=0 and a de-activated S&H 1405.

In FIG. 14, ZCI 1420 is shown as straddling the bit lines between the memory cells and the S&H circuits for illustrative purposes, but in practice ZCI 1420 can be located further into the periphery as convenient, but with each S&H element 1405 configured to receive the correspond zero column index ZCI value. The content of ZCI can be pre-configured by: the training machine after the pruning process (FIG. 13); the inference engine can read out then infer the all-zero columns of each sub-array; or the host machine can read out and then infer the all-zero row/columns of each sub-array in inference phase. The configuring of the ZCI values is discussed below with respect to FIGS. 17-19.

Figure 15:
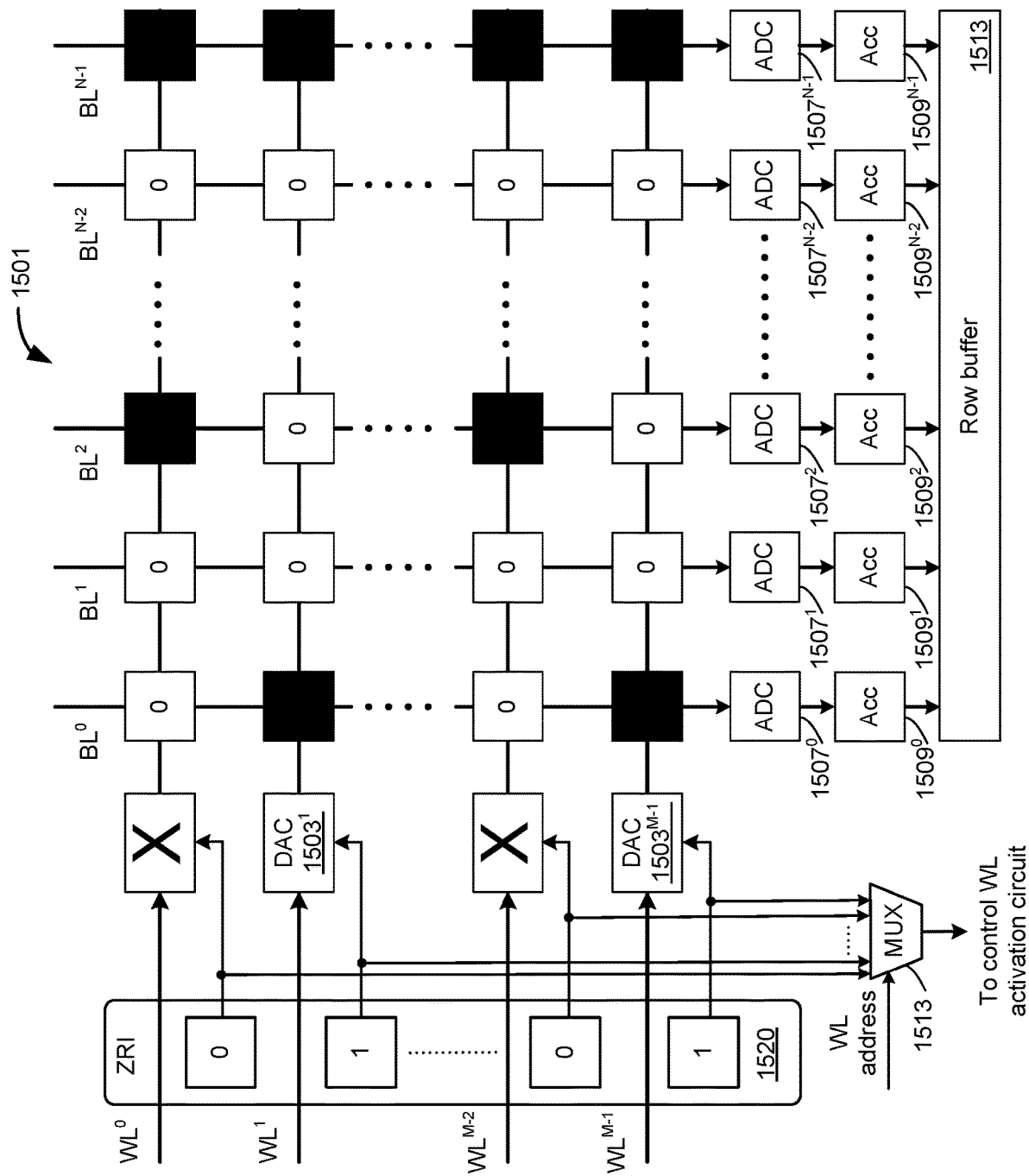

The use of the ZCI values can provide energy savings as, when ZCI=0, there is no need to access the corresponding bit line. This is illustrated schematically with multiplex circuit MUX 1411 that receives the bit line addresses and also the ZCI values from the ZCI register 1420. If the selected bit line address matches a bit line with ZCI=0, the MUX 1411 can notify the bit line activation circuit, along with the ADC 1407 and shift and add 1409 so that the corresponding column can just be skipped in the sensing operation. This approach readily scales up to support large sparse matrix multiplication operations at high performance FIG. 15 is an embodiment for an architecture that can leverage all-zero rows of a storage class memory sub-array to reduce the number of word line accesses to improve performance and energy efficiency. Similarly to FIG. 14, FIG. 15 illustrates an array, or portion of an array, 1501 of resistive non-volatile memory cells and peripheral elements, similar to the portions of the array shown in FIG. 9, but with the memory cells represented as blocks at the intersection of word lines and bit lines. N bit lines, running from $BL^0$ to $BL^{N-1}$, and M word lines, running from $WL^0$ to $WL^{M-1}$, are shown and can represent the whole of an array or a compact portion of a larger array. The memory cells have been written with a set of weights of a CNN to form a filter for use in a convolution. Depending on the embodiment, the weights (and the inputs) can be binary, multi-level, or even analog. In any case, the weights are shown to have a fairly high degree of sparsity, where zero weights are represented as having a "0" in the corresponding block and non-zero weights have their corresponding block shaded. In FIG. 15, the rows corresponding to $WL^0$ and $WL^{M-2}$ are all-zero rows, so that for any input value, the output along the bit lines from this row will be zero.

The input to the array 1501 is applied to the word lines $WL^0$-$WL^{M-1}$. In FIG. 15, the word line drivers and decoder circuitry are represented by the digital to analog converters DAC 1503, which translate a digital value from a vector of input values into an analog voltage. Based on the input vector values and the weights, an output current is generated along the bit lines as discussed above with respect to FIG. 10. The sensing circuitry for each bit line includes an analog to digital converter ADC 1507 (including sense amplifier) and a digital accumulator 1509 that can accumulate the values along each bit lines as the word lines are sequentially activated. The output of the accumulators 1509 is then transferred on to a row buffer 1513, from where it can be transferred on to the controller, be process on the memory die, or both. The type of peripheral circuit elements (DAC 1503, ADC 1507, accumulator 1509, row buffer 1513) can be selected differentially depending upon specific design constraints of the embodiment.

In a column-oriented access, bit lines are activated in parallel, with the word lines sequentially charged to be read out. For an all-row column, however, as the result will be zero for all of the bit lines, such an access can be skipped if the column is already known to be all-zero. For this purpose, a Zero Row Index (ZRI) 1520 is added at the array or sub-array level, adding one vector per array or sub-array. The size of the ZRI 1520 is the number of word lines in the array or subarray 1501. Each word line $WL^0$ has an entry in ZRI 1520 where, in this embodiment, $ZRI^i = $ '0' indicates the $i^{th}$ row having all-zero weights and $ZRI^i = $ '1' indicates the $i^{th}$ row having at least one non-zero weight. The entries of ZRI 1520 are connected to the corresponding DAC 1503, so that if the index ZRI=0 the corresponding DAC 15031405 is de-activated (indicated by an X) and if the index ZRI=1 the corresponding DAC 1503 is activated. As illustrated for the example weights in FIG. 15, rows 1 and (M−2) have a ZRI=0 and a de-activated DAC 1503.

In FIG. 15, ZCI 1520 is shown as straddling the word lines adjacent to the DAC 1503 of the word line for illustrative purposes, but in practice ZRI 1520 can be located further into the periphery as convenient, but with each DAC 1503 configured to receive the correspond zero column index ZRI value. The content of ZRI 1520 can be pre-configured by: the training machine after the pruning process (FIG. 13); the inference engine can read out then infers the all-zero columns of each sub-array; or the host machine can read out then infers all-zero row/columns of each sub-array in inference phase. The configuring of the ZRI values is discussed below with respect to FIGS. 17-19.

The use of the ZRI values can provide energy savings as, when ZRI=0, there is no need to access the corresponding word line. This is illustrated schematically with multiplex circuit MUX 1513 that receives the word line addresses and also the ZRI values from the ZRI register 1520. If the selected word line address matches a word line with ZRI=0, the MUX 1513 can notify the word line activation circuit so that the corresponding row can just be skipped in the sensing operation. This approach readily scales up to support large sparse matrix multiplication operations at high performance.

Figure 16:
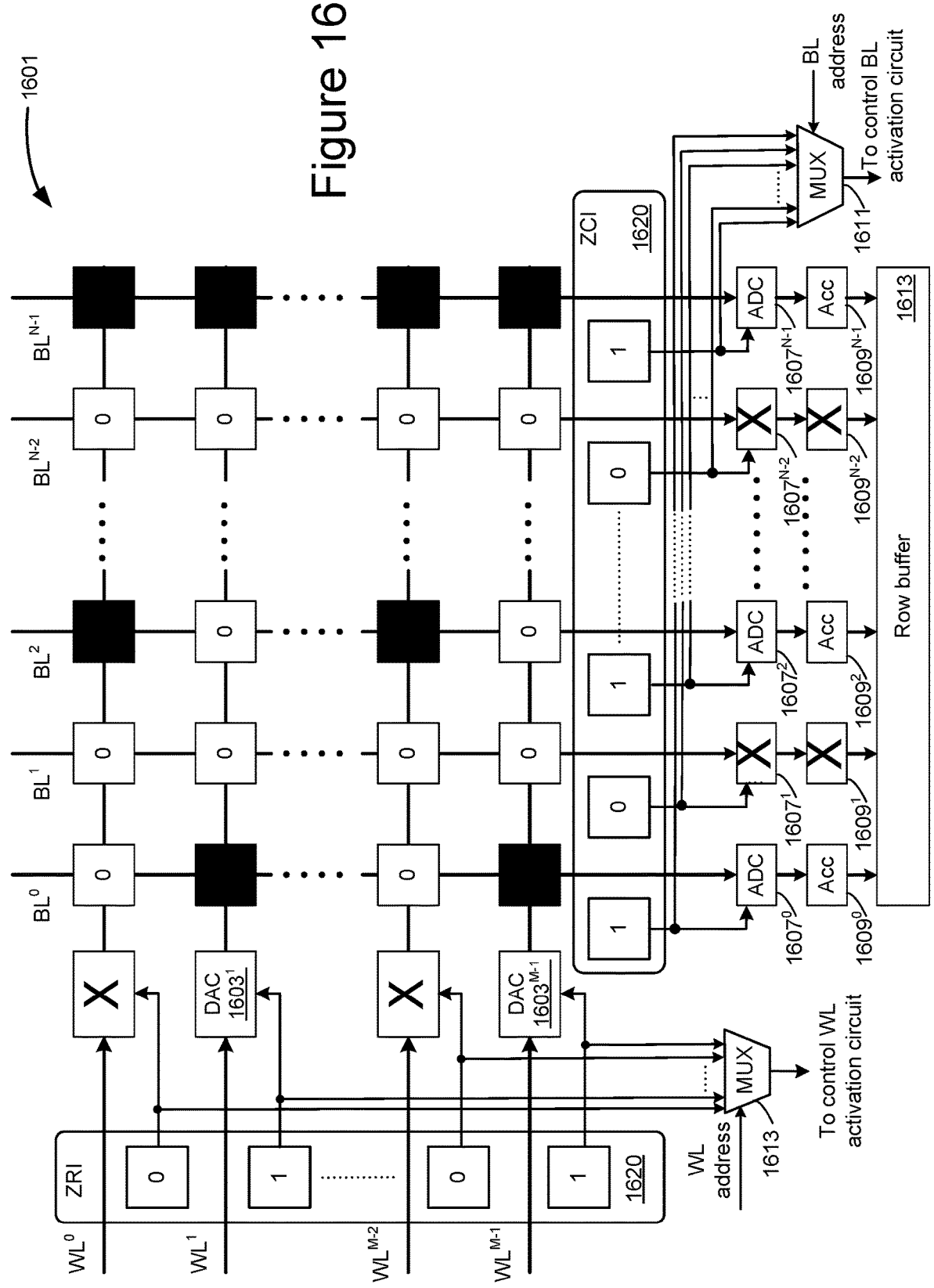

FIG. 16 is an embodiment with a flexible architecture that can support all-zero rows and all-zero columns, combining the features from the embodiments of FIGS. 14 and 15 in order to be able to reduce word line or bit line accesses to improve performance and energy efficient. Relative to FIGS. 14 and 15, the embodiment of FIG. 16 has somewhat larger layout requirements, but provides support for both all-zero rows columns by having both ZCI and ZRI vectors for each sub-array. Elements of FIG. 16 are numbered similarly to the corresponding elements of FIGS. 14 and 15 (e.g., 1411 is now 1611, 1513 is now 1613, etc.)

One mode at a time can be configured for usage by the inference machine (i.e., the memory device with weights programmed into the memory array or arrays) depending on whether higher all-zero sparsity is found in the columns, in which the array 1601 can be operated as in FIG. 14, or rows, in which the array 1601 can be operated as in FIG. 15, for the weight matrix as stored in FIG. 16. In the column access mode, the ADC 1607 and digital accumulator 1609 would be de-activated for columns 1 and (N−2). In the row access mode, the DAC 1603 for rows 0 and (M−2) would be de-activated.

Considering the generic situation of FIGS. 14-16, the memory cells are connected between a first set of access lines running in a first direction (i.e., either bit lines or word lines) and a second set of access lines running in a second direction (i.e., respectively either word lines or bit lines). The register then holds bits corresponding to the first access lines (i.e., bit line in FIG. 14, word line in FIG. 15) that hold all-zero weight values (or other specified weight values). The embodiment of FIG. 16 allows for both options.

Figure 17:
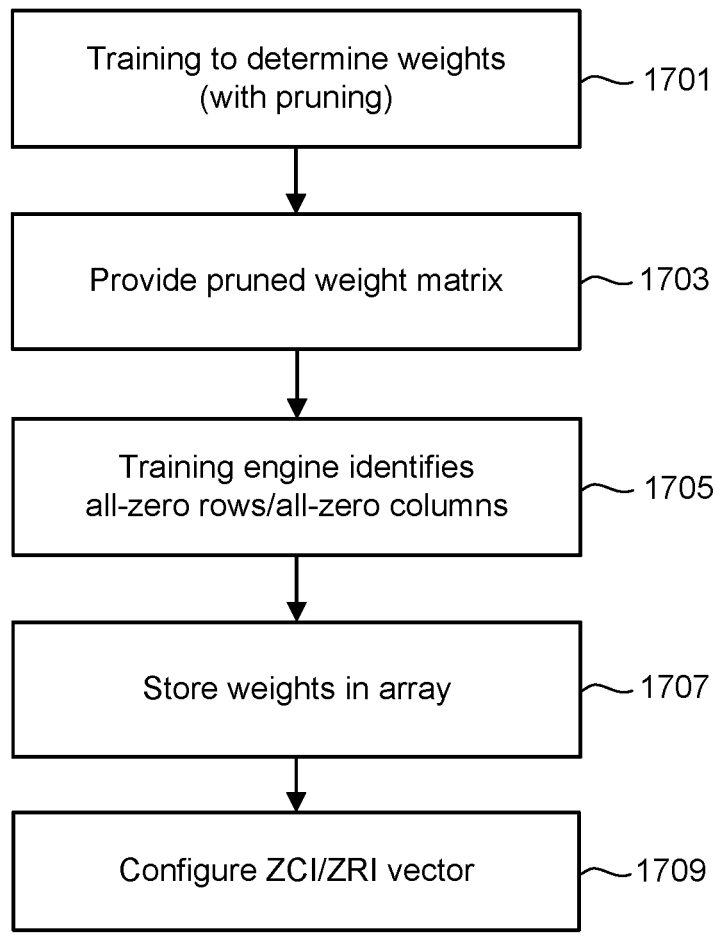
FIGS. 17-19 are flowcharts for embodiments to configure the zero-column index/zero-row index register of a memory die.
Figure 18:
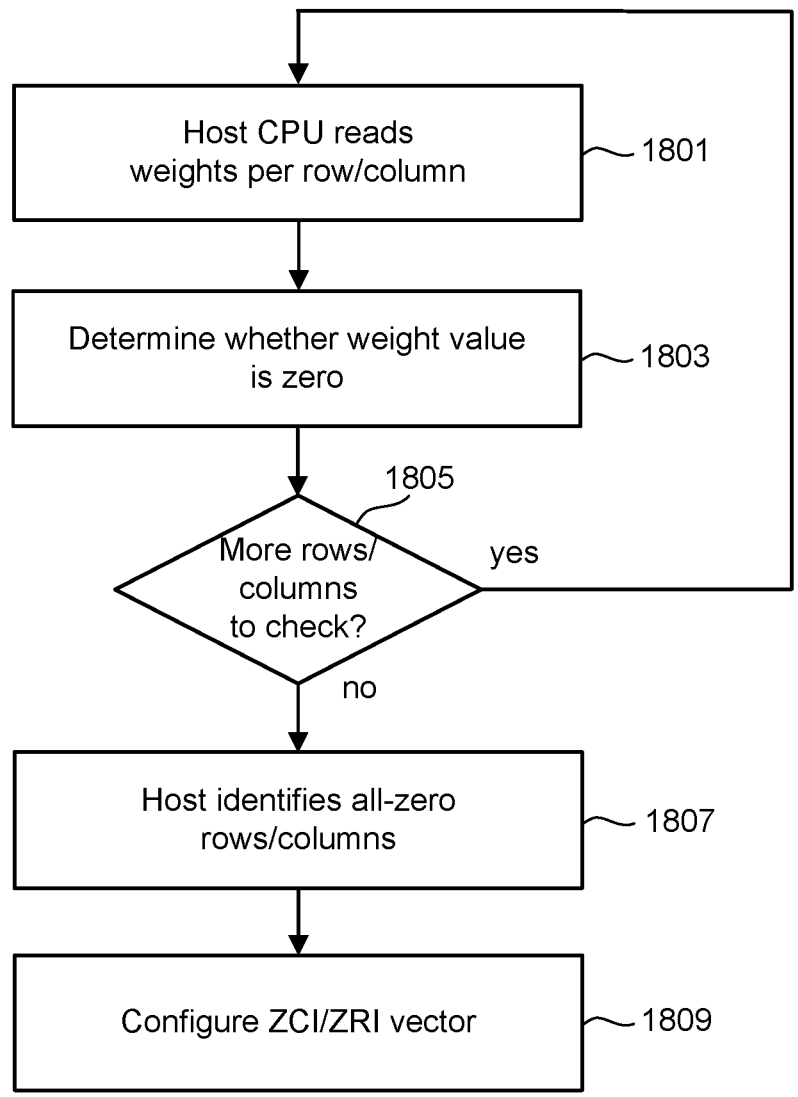
Figure 19:
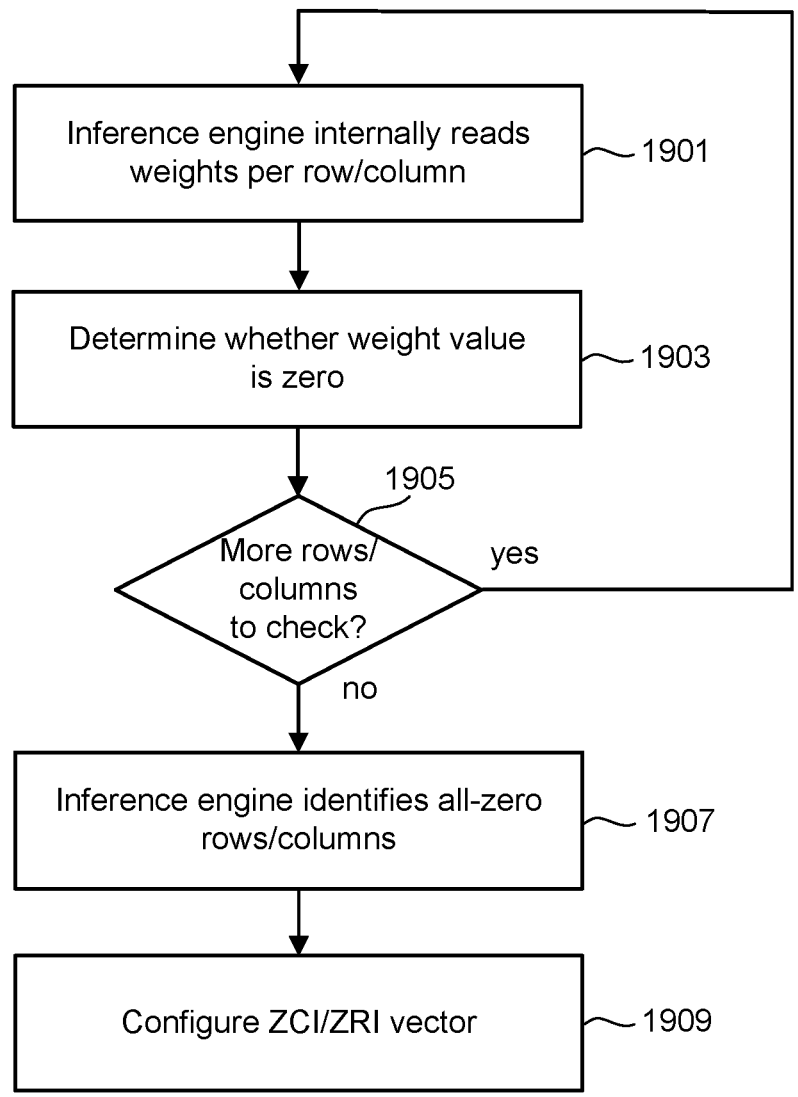

FIGS. 17-19 are flowcharts for embodiments to configure the zero-column index/zero-row index register of a memory die, such as ZCI/ZRI 320 of FIG. 5, ZCI 1420 of FIG. 14, ZRI 1520 of FIG. 15, or ZCI/ZRI 1620 of FIG. 16. In the embodiment of FIG. 17, a training engine can externally configure the ZCI/ZRIs during the training phase for the array. In the embodiment of FIG. 18, a host CPU, that may or may not be the same as training engine, can externally configure the ZCI/ZRIs before inferencing phase. In the embodiment of FIG. 19, the ZCI/ZRIs are configured internally by the inferencing engine before inferencing input data.

The flow of FIG. 17 begins at step 1701 with the training of a neural network by a training engine, where the training can include pruning of weights. For example, step 1701 can correspond to the flow of FIG. 13. Once the weights are determined, at step 1703 the pruned weight matrix is available. Once the values of the weights are known, along with how these will be stored on an array, the training engine can determine the number and locations of all-zero columns, all-zero rows, or both, depending on the embodiment at step 1705. Once the weights and the ZCI/ZRI vectors are determined at steps 1703 and 1705, the weights can be written into the die at step 1707 and the ZCI/ZRI register values configured at step 1709 to hold the ZCI/ZRI vectors. Although the flow of FIG. 17 is ordered to show the memory array being configured to store the weights at step 1707, in other embodiments the weights can be written into the array before step 1705 or after, or concurrently, with step 1709.

FIG. 18 is a flow for an embodiment in which a host CPU, such as host processor 122 of host 120 in FIG. 1, externally configures the ZCI/ZRI register values before the corresponding array is used for inferencing. In this embodiment, the weights can have been previously written into the array and the host CPU can be different than the training engine or, in some cases, may be the same. Beginning at step 1801, the host issues a command to the array to begin reading weights along each of the bit line (for ZCI values), each word line (for ZRI values), or both (for an embodiment as in FIG. 16 that uses both the zero-column and zero-row vectors) of the array. The read process can be a standard read process.

Step 1803 determines if the column or row being checked is or is not all zeros and the corresponding column or row of the ZCI/ZRI vector is set accordingly. Step 1805 determines whether there are more columns or rows to check and, if so, the flow loops back to step 1801 to check the next column or row. In an embodiment such as FIG. 14, only the columns need be checked, while in an embodiment such as FIG. 15 need only check the rows. For an embodiment such as FIG. 16, both rows and columns would be checked to assemble the ZCI/ZRI vectors, where the checking of columns and rows can be done in either order as convenient. Once all of the columns and/or rows have been checked, the flow moves from step 1805 to step 1807 with the host identifying the all-zero rows/columns. Based on these vectors' values, the ZCI/ZRI registers can be configured according to the mode in which the array will be used and inferencing can begin.

In the flow of FIG. 18, the ZCI/ZRI register is externally configured by a host's CPU before inferencing. Consequently, to determine the zero weights the host will have access to the weight values stored on the host. In some applications, the provider of the weights may want to keep this data set secure, so that it cannot be accessed by a host or user, but only used for inferencing. FIG. 19 is a flow for the ZCI/ZRI vectors to be configured internally by the inference engine itself, so that weight data does not need to be externally accessed and can be kept secure.

FIG. 19 is a flow for an embodiment in which an inference engine (that is, the memory system storing weights and which performs the inferencing as an in-array operation) itself configures the ZCI/ZRI vectors before the array is used for inferencing. In this embodiment, the weights have been previously written into the array. Depending on the embodiment, the processed can be performed on the memory die itself by the on-chip control circuitry (310 of memory die 300 in FIG. 5), at the memory package level, or by the controller 102 of the memory system 100 in FIG. 1. For any of these cases, information on the weights themselves need not be transferred over the bus structure 130 to the host 120. Beginning at step 1901, the inference engine reads a single weight along each of the bit lines or word lines of the array. Step 1901 can be performed as described above with respect to step 1801 of FIG. 25, except that the process is controlled by the inferencing engine itself without host involvement, except possible for a command that would initiate the ZWR configuration process. Alternately, the ZCI/ZRI vector configuration process could be initiated by the inferencing engine as a first phase in response to a request to perform inferencing. Steps 1903, 1905, 1907, and 1909 can performed similarly to respective steps 1803, 1805, 1807, and 1809, but again as an internal process for the inferencing engine.

Figure 20:
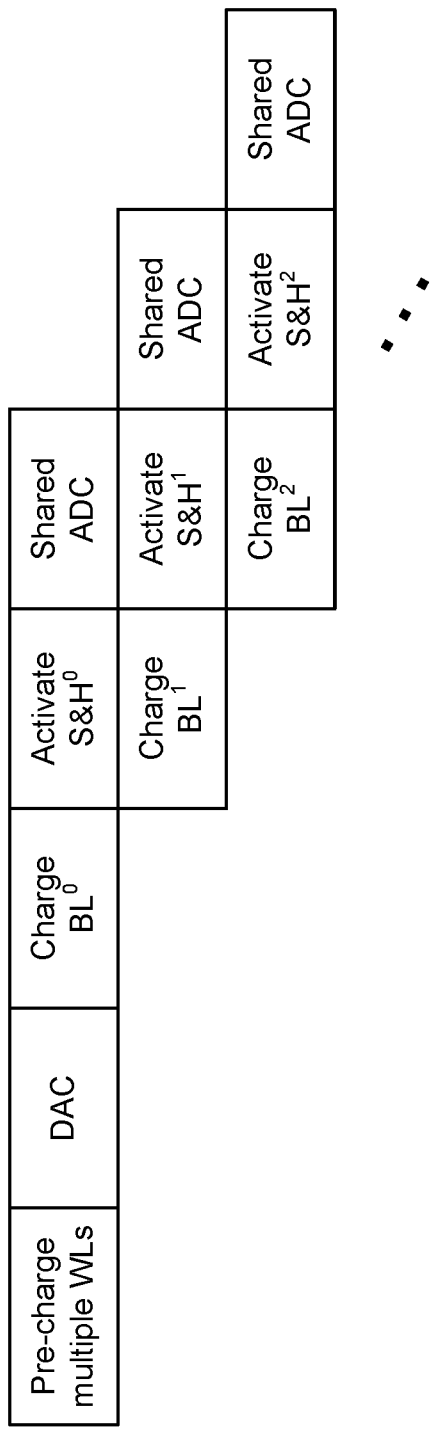
FIGS. 20 and 21 compare the performance and energy efficient of a conventional column oriented inferencing operation (without the use of a zero-column index mechanism) with that of the embodiment of FIG. 14 (using the zero-column index mechanism).
Figure 21:
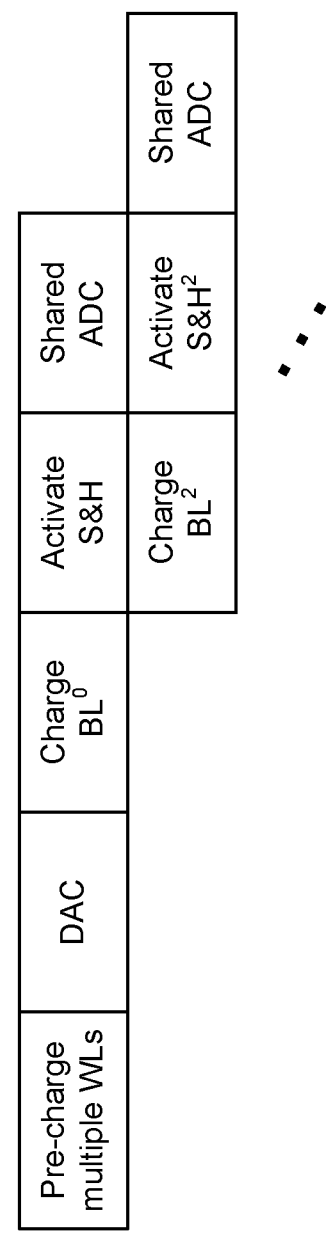

FIGS. 20 and 21 compare the performance and energy efficiency of a conventional column oriented inferencing operation (without the use of the ZCI mechanism) with that of the embodiment of FIG. 14 (using the ZCI mechanism). FIGS. 20 and 21 illustrate a column oriented inference for an array having, as illustrated in FIG. 14, an all-zero column of weights along $BL^1$, where the access of the first three bit lines are explicitly shown.

The inference process of FIG. 20 can be described with respect to FIG. 14, but where the register ZCI 1420 and MUX 1411 are ignored. In FIG. 20 the inferencing process begins with the pre-charge of multiple ones of $WL^0$-$WL^{M-1}$ based on the vector of input values. These values are then converted to the analog voltage values applied to drive the word lines by the DACs 1403. The bit lines can then be accessed, starting with $BL^0$ that is accessed, followed activating S&H⁰ 1405⁰, and then the transference of the value in S&H⁰ 1405⁰ to the shared ADC 1407. Once the word lines are pre-charged the word lines biased by the DACs 1403, the bit lines can proceed sequentially, with the steps overlapped to pipeline the process, so that $BL^1$ is accessed concurrently with activating S&H⁰ 1405⁰; $BL^2$ is accessed concurrently with activating S&H⁰ 1405¹ and transference of the value in S&H⁰ 1405¹ to the shared ADC 1407; and so on through all of the columns of weight to be accessed.

Letting N denote the total number of columns (the number of bit lines) for FIG. 20, $T^{pre-charge\ WLs}$ the time to pre-charge the word line, $T^{DAC}$ the time needed for the DACs 1403, $T^{PP}$ the time to access a bit line, and, to simplify the calculation, that the time to charge a bit line is the same as to activate the corresponding sample and hold circuit and to active the shared ADC, then the total latency of the operation illustrated in FIG. 20 can be estimated as:

$$\text{Total latency} = T^{pre-charge\ WLs} + T^{DAC} + (N+2)*T^{PP},$$

where the 2 in the (N+2) is for final activating of $S\&H^N$ 1405ᴺ and transference of the value in $S\&H^{N-1}$ 1405ᴺ⁻¹ to the shared ADC 1407, as this is not hidden behind operations of following column. In terms of energy consumption, letting $P^{pre-charge\ WLs}$ represent the power to pre-charge the word line, $P^{DAC}$ represent the power to pre-charge one of DACs 1403, and $P^{PP}$ represent the power to charge a bit line, then the total energy consumed for the process illustrated in FIG. 20 can be estimated as:

$$\text{Total energy} = T^{pre-charge\ WLs}*P^{pre-charge\ WLs} + T^{DAC}*P^{DAC} + (N+2)*T^{PP}*P^{PP},$$

where the 2 in the (N+2) comes from assuming that the pipelined stages (charging a bit line, activating a sample and hold circuit, and activating the shared ADC) have the same power $P^{PP}$.

Turning now to the process of FIG. 21 and taking into account all of the elements of FIG. 14, including the register ZCI 1420 and MUX 1411, the knowledge that a column contains all zeros means that result from that column (namely, 0 for any input) can be accounted for in the multiplication (or reported out to a host from the inference engine) without need to actually see the result of applying the input to the all-zero column. For example, in FIG. 14 $BL^1$ and $BL^{N-2}$ hold all zero weights and have a zero in the corresponding entry in ZCI 1420. Based on this, the corresponding sample and hold circuits 1405 will not activated. Based bit line address and the entries in ZCI 1420, the output MUX 1411 goes to the ADC 1407, shift and add circuit and the bit line activation circuit so that the ADC also need to be active for a column with a zero entry in ZCI 1420 and that the shift and add register 1409 can account for this column Consequently, in the process of FIG. 21, after accessing $BL^0$, $BL^1$ (that has all-zero entries in this example) is skipped and $BL^2$ is accessed next. The process then continues as in FIG. 20, but with other bit lines with all zero entries (e.g., $BL^{N-2}$ in the example of FIG. 14) being similarly skipped.

Letting $N^{azc}$ denote the number of all-zero columns and using the same notation as assumptions as in the discussion of FIG. 20, then the total latency of the process of FIG. 21 can be estimated as:

$$\text{Total latency} = T^{pre-charge\ WLs} + T^{DEC} + (N-N^{azc}+2)*T^{PP},$$

as only the $(N-N^{azc})$ non-zero columns contribute. Similarly, the total energy consumed for the processed illustrated in FIG. 21 can be estimated as:

$$\text{Total energy} = T^{pre-charge\ WLs}*P^{pre-charge\ WLs} + T^{DAC}*P^{DAC} + (N-N^{azc}+2)*T^{PP}*P^{PP}.$$

As $N^{azc} \leq N$, these will both be less than the corresponding expression for the process of FIG. 20. Without losing the accuracy, the third component of these expressions of latency and energy can be assumed to be dominant. This provides a lower bound of performance and energy efficiency gain as $N/(N-N^{azc}) \geq 1$.

Figure 22:
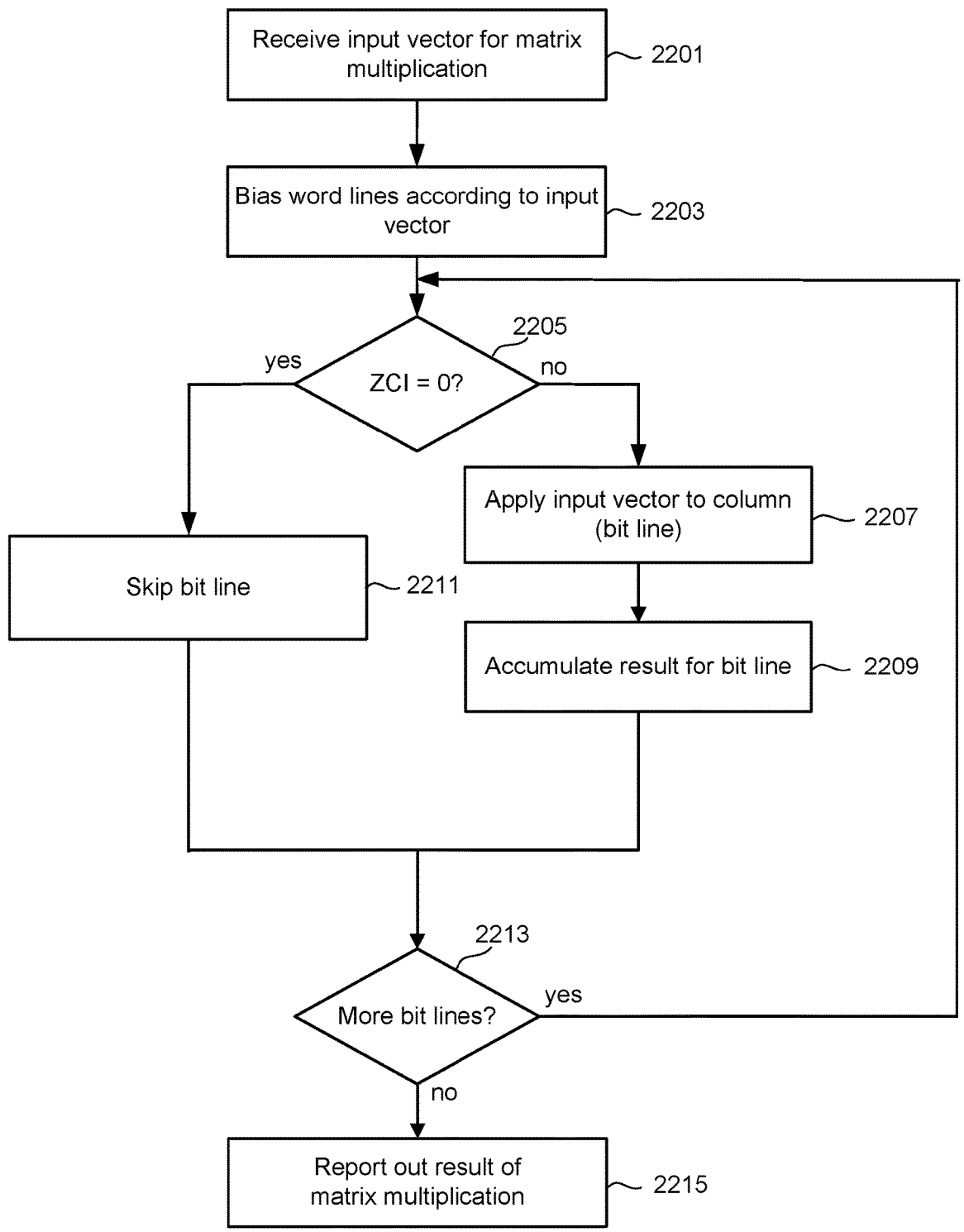
FIG. 22 is a flowchart describing one embodiment of a process of a column oriented matrix multiplication operation using the embodiment of FIG. 14 or the embodiment of FIG. 16 when used in a column oriented mode.

FIG. 22 is a flowchart describing one embodiment of a process of a column oriented matrix multiplication operation using the embodiment of FIG. 14 or the embodiment of FIG. 16 when used in a column oriented mode. Starting at step 2201, a vector of input values, or input vector, is received at the inference engine and the word lines of an array or portions of the array to which the input vector is to be applied are biased according input vector at step 2203. Referring back to FIG. 21, this would correspond to the pre-charge of word lines block and DAC block.

Once the word lines are biased according to the values of the input vector, the flow works through the bit lines to determine their contributions to the matrix multiplication. Starting with a first bit line, step 2205 determines whether the ZCI index for the bit line is zero, and should be skipped, or 1, and the product of the input and column needs to be determined. If the column is not to skipped, the flow proceeds to step 2207 and the input vector is applied to the column and the result on the bit line is determined, which corresponds to the multiplication of the input vector with the column. Step 2207 can be taken to correspond to the Access BL, activate S&H, and Shared ADC blocks along a line of FIG. 21. The result of step 2207 is then accumulated at step 2209, as performed by the shift and add register 1409 in FIG. 14 or the digital accumulators 1609 of the embodiment of FIG. 16. If, at step 2205, the ZCI value for the current bit line is zero, the bit line is skipped at step 2211. Although FIG. 22 illustrates the flow as having two paths out of step 2205 before reaching step 2213, as illustrated with respect to FIG. 21, steps 2207 and 2209 can be implemented in a pipelined process in which the skips of step 2211 are interleaved.

From either step 2211 or 2209, the flow goes to step 2213 to determine whether there are more bit lines in the convolution. If so, the flow loops back to step 2205; and, if not, the flow goes to step 2215 and the result of the matrix multiplication can be reported out. The flow of FIG. 22 illustrates the process for only a single input vector. If the matrix multiplication, or convolution, includes further input vectors, the entire flow can loop back to step 2201 for the next vector of input values, repeating the process until the convolution is complete.

Figure 23:
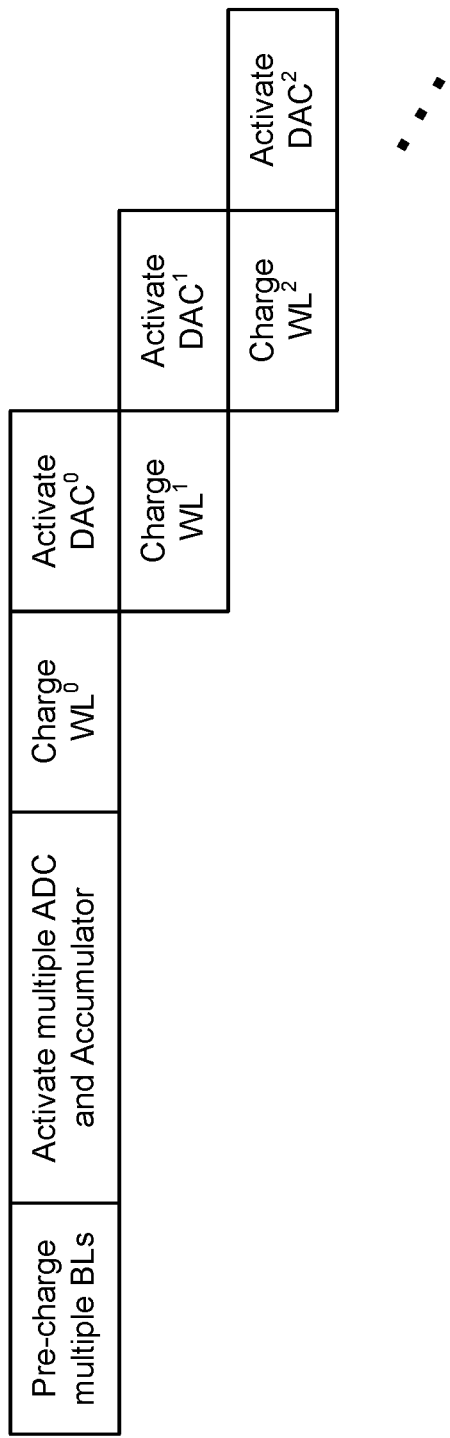
FIGS. 23 and 24 compare the performance and energy efficient of a conventional row oriented inferencing operation (without the use of the zero-row index mechanism) with that of the embodiment of FIG. 15 (using the zero-row index mechanism).
Figure 24:
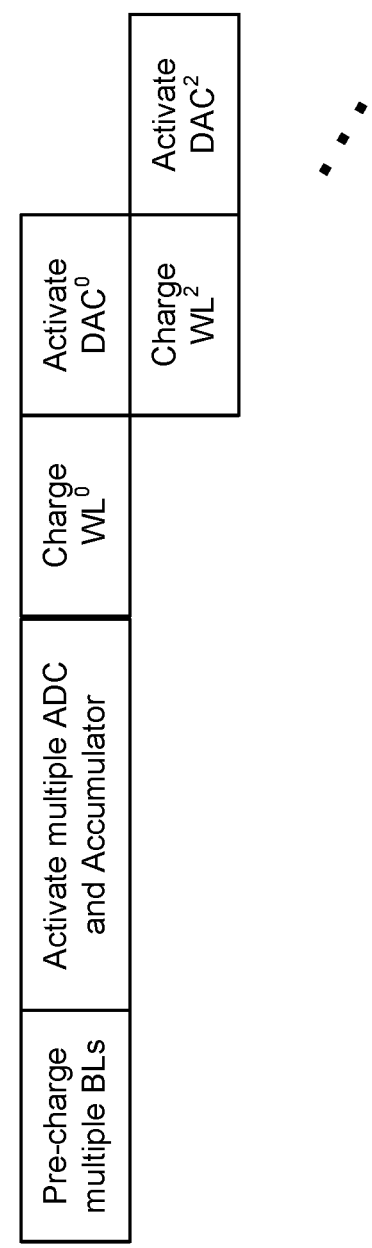

FIGS. 23 and 24 compare the performance and energy efficiency of a conventional row oriented inferencing operation (without the use of the ZRI mechanism) with that of the embodiment of FIG. 15 (using the ZRI mechanism). FIGS. 23 and 24 illustrate a row oriented inference for an array having, as illustrated in FIG. 15, an all-zero row of weights along $WL^0$, where the access of the first three word lines are explicitly shown.

The inference process of FIG. 23 can be described with respect to FIG. 15, but where the register ZRI 1520 and MUX 1513 are ignored. In FIG. 23 the inferencing process begins with the pre-charge of multiple ones of $BL^0$-$BL^{N-1}$ for a matrix multiplication involving these N bit lines. The ADCs 1507 and digital accumulators 1509 are then activated for each of bit lines $BL^0$-$BL^{N-1}$. The word lines can then be accessed, starting with $WL^0$ that is charged, followed by activating the corresponding $DAC^0$. The resultant currant can then be determined by the $ADC^0$ 1507 along each of $BL^0$-$BL^{N-1}$ with the result going to the corresponding digital accumulator. The charging of word lines and activation of DACs can be pipelined for the set of word lines receiving the values of the input vector. For example, as shown in FIG. 23, while DAC⁰ is being activated WL¹ can be charged, and so on for all other word lines involved in the inference operation.

Letting M denote the total number of rows (the number of word lines) for FIG. 23, $T^{pre-charge\ BLs}$ the time to pre-charge the bit lines, $T^{ADC+acc}$ the time needed to activate the ADCs 1507 and digital accumulators 1509, $T^{PP}$ the time to charge a word line, and, to simplify the calculation, that the time to activate a DAC is the same as the time to charge the corresponding word line, then the total latency of the operation illustrated in FIG. 23 can be estimated as:

$$\text{Total latency} = T^{pre-charge\ CLs} + T^{ADC+acc} + (M+1)*T^{PP},$$

where the 1 in the (M+1) is for final activating of $DAC^{M-1}$ 1507$^{M-1}$, as this is not hidden behind operations of a following row. In terms of energy consumption, letting $P^{pre-charge\ BLs}$ represent the power to pre-charge the bit lines, $P^{ADC+acc}$ represent the power to activate the ADCs 1507, and $P^{PP}$ represent the power to charge a word line, then the total energy consumed for the process illustrated in FIG. 23 can be estimated as:

$$\text{Total energy} = T^{pre-charge\ BLs} * P^{pre-charge\ BLs} + T^{ADC+acc} * P^{ADC+acc} + (M+1)*T^{PP}*P^{PP},$$

where the 1 in the (M+1) comes from assuming that the pipelined stages (charging a word line and activating the multiple ADCs and digital accumulators) have the same power $P^{PP}$.

Turning now to the process of FIG. 24 and taking into account all of the elements of FIG. 15, including the ZRI 1520 and MUX 1515, the knowledge that a row contains all zeros means that results from that row (namely, 0 for all columns) can be accounted for in the multiplication (or reported out to a host from the inference engine) without need to actually see the result of applying an input to the all-zero row. For example, in FIG. 15 WL⁰ and WL$^{M-2}$ hold all zero weights and have a zero in the corresponding entry in ZRI 1520. Based on this, the corresponding word line need not be charged and the corresponding DAC 1503 will not activated. Based word line address and the entries in ZRI 1520, the output MUX 1515 goes to the word line activation circuit so that word line need not be charged and the DAC also need to be activated for a row with a zero entry in ZRI 1520. Consequently, in the process of FIG. 24, WL⁰ is skipped as it is an all-zero row and the process starts with WL¹. The process then continues as in FIG. 23, but with other word lines with all zero entries (e.g., WL$^{M-2}$ in the example of FIG. 15) being similarly skipped.

Letting $M^{azr}$ denote the number of all-zero rows columns and using the same notation as assumptions as in the discussion of FIG. 23, then the total latency of the process of FIG. 24 can be estimated as:

$$\text{Total latency} = T^{pre-charge\ BLs} + T^{AD+acc} + (M-M^{azr}+1)*T^{PP},$$

as only the $(M-M^{azr})$ non-zero rows contribute. Similarly, the total energy consumed for the processed illustrated in FIG. 24 can be estimated as:

$$\text{Total energy} = T^{pre-charge\ BLs} * P^{pre-charge\ BLs} + T^{ADC+acc} * P^{ADC+acc} + (M-M^{azr}+1)*T^{PP}*P^{PP}.$$

As $M^{azr} \leq M$, for of these expressions will be less than the corresponding expression for the]process of FIG. 23. Without losing the accuracy, the third component of these expressions of latency and energy can be assumed to be dominant. This provides a lower bound of performance and energy efficiency gain as $M/(M-M^{azr}) \geq 1$.

Figure 25:
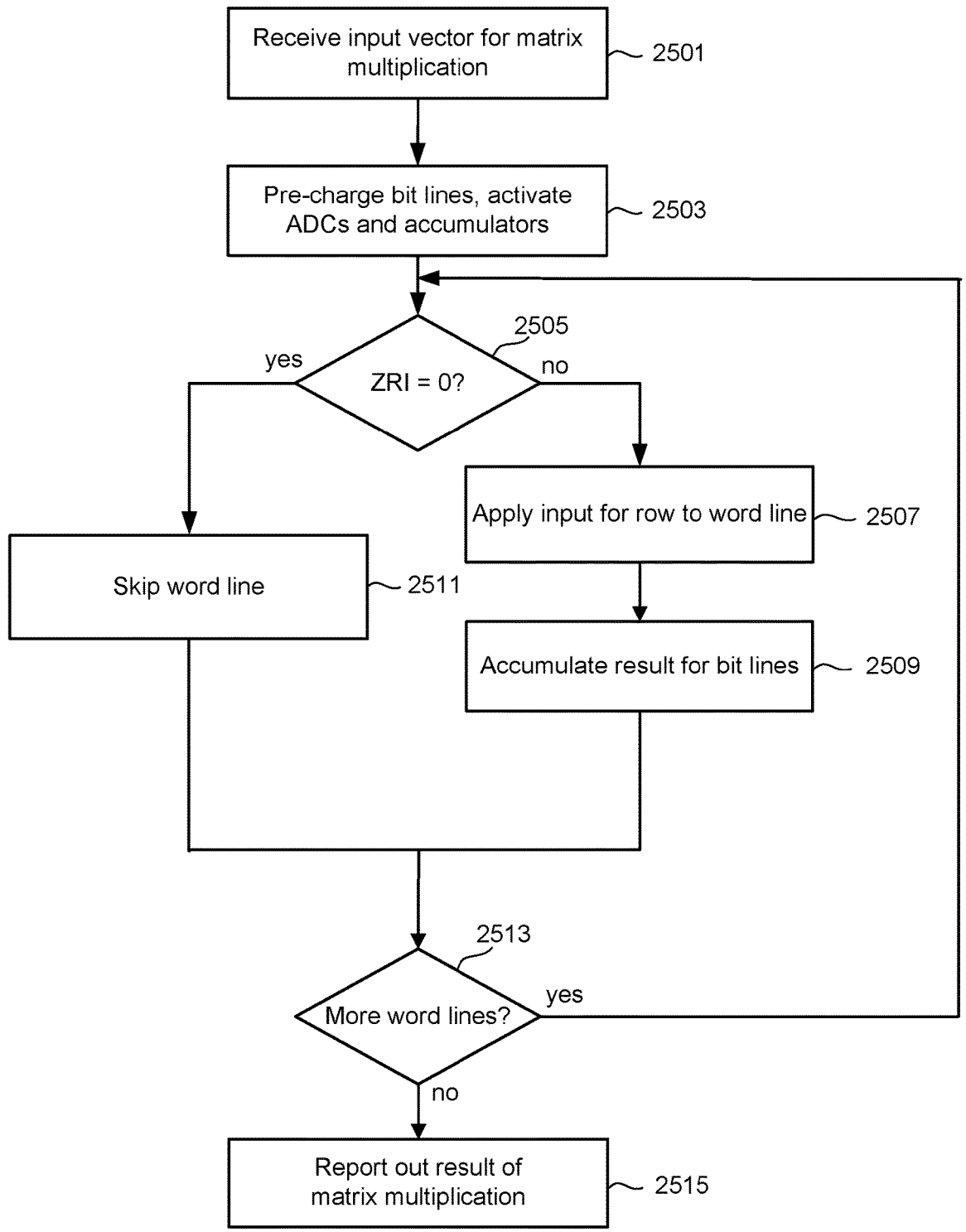
FIG. 25 is a flowchart describing one embodiment of a process of a row oriented matrix multiplication operation using the embodiment of FIG. 15 or the embodiment of FIG. 16 when used in a row oriented mode.

FIG. 25 is a flowchart describing one embodiment of a process for a row oriented matrix multiplication operation using the embodiment of FIG. 15 or the embodiment of FIG. 16 when used in a row oriented mode. Starting at step 2501, a vector of input values is received at the inference engine and the bit lines of an array or portions of the array to which the input vector is to be applied are pre-charged and the ADCs 1507 and digital accumulators 1509 are activated at step 2503. Referring back to FIG. 24, this would correspond to the pre-charge of bit lines block and the activate ADC and accumulator block.

Once the bit lines are biased, the flow works through the word lines corresponding to the input vector to determine their contributions to the matrix multiplication. Starting with a first word line, step 2505 determines whether the ZRI index for the word line is zero, and should be skipped, or 1, and the product of the input and weights along the word line needs to be determined. If the row is not to skipped, the flow proceeds to step 2507 and the input for the corresponding word line is applied and the results on the bit lines are determined, which corresponds to the multiplication of an entry of the input vector with the weights along the row. Step 2507 can be taken to correspond to the charge WL and activate DAC blocks along a line of FIG. 24. The result of step 2207 is then accumulated at step 2509, as performed by the digital accumulators 1509 in FIG. 19 or the digital accumulators 1609 of the embodiment of FIG. 16. If, at step 2505, the ZRI value for the current word line is zero, the word line is skipped at step 2511. Although FIG. 25 illustrates the flow as having two paths out of step 2505 before reaching step 2513, as illustrated with respect to FIG. 22, steps 2507 and 2509 can be implemented in a pipelined process in which the skips of step 2511 are interleaved.

From either step 2511 or 2509, the flow goes to step 2513 to determine whether there are more word lines in the convolution. If so, the flow loops back to step 2505; and, if not, the flow goes to step 2515 and the result of the matrix multiplication can be reported out. The flow of FIG. 25 illustrates the process for only a single input vector. If the matrix multiplication, or convolution, includes further input vectors, the entire flow can loop back to step 2501 for the next input vector, repeating the process until the convolution is complete.

The embodiments presented above provide storage class memory array, or sub-array, for in-memory computing architectures to accelerate convolution neural network inference. The described architecture can leverage all-zero rows or all-zero columns to improve performance and energy efficiency of sparse matrix multiplication, which is the compute-intensive kernel of the CNN inference process. As described above, the non-volatile array structure is extended by a zero-column index (ZCI), a zero-row index ZRI or both vectors which indicate the all-zero row or/and column sparsity of a weight matrix, such as is achieved by pruning approaches for CNN inference. The use of the ZCI and ZRI bits allows for the elimination of unnecessary accesses to bit lines or word lines that contain all-zero weight values by deactivating their associated input/out, improving both performance and energy efficiency of CNN inference with sparse matrix multiplication.

Relative to a conventional storage class memory sub-array architecture, the embodiments illustrated with respect to FIGS. 14-16 require only fairly minor architectural changes to accelerate sparse matrix multiplication in CNN inference. With respect to standard storage class memory operation, no circuit changes are needed. The added ZCI and/or ZRI registers are relatively small, as these store small vectors with one bit per bit line and/or word line. The MUX-based circuitry manage bit line/word line accesses are simple, as are their associated input/output circuits introduced to improve both performance and energy efficiency of SCM-based memory system.

According to a first set of aspects, an apparatus includes an array of non-volatile memory cells having a plurality of first access lines running in a first direction, a plurality of second access lines running in a second direction, and a plurality of non-volatile memory cells, each of the plurality of first access lines connected to one of the plurality of second access lines through one of the plurality of memory cells. The apparatus also includes a register configured to hold a bit for a corresponding one of each of the first access lines indicating whether all of the memory cells connected to a corresponding first access line store a specified data value. The apparatus further includes one or more control circuits connected to the array of non-volatile memory cells and the register. The one or more control circuits care configured to receive a plurality of input values, sequentially apply the input values to the first access lines, skipping ones of the first access lines for which the corresponding bit of the register indicates that all of the memory cells connected thereto have the specified data value stored therein, and accumulate an output of the array in response to sequentially applying the input values to the first access lines.

In additional aspects, a method includes receiving at a non-volatile memory device a vector of input values from a host, maintaining, in a register on the non-volatile memory device, an indication for a filter of a convolutional neural network stored in an array of the non-volatile memory device of one or both of columns that store all zero weight values or rows that store all zero weight values, and performing an in-memory matrix multiplication operation between the vector of input values and the filter. The matrix multiplication includes: translating each input value of the vector into a corresponding voltage level; and applying the voltage levels to rows of the array in either a column oriented mode, wherein the array is accessed on a column by column basis skipping columns having an indication of storing all zero weight values, or a row oriented mode, wherein the array is accessed on a row by row basis skipping rows having an indication of storing all zero weight values.

Further aspects include a non-volatile memory circuit having an array of a plurality of non-volatile memory cells, a register, and one or more control circuits connected to the array and to the register. The array of a plurality of non-volatile memory cells is formed into column and rows, each of the non-volatile memory cells configured to store a weight of a filter of a convolutional neural network. The register is configured to store one or both of an indication of columns that store all zero weight values and rows that store all zero weight values. The one or more control circuits connected are configured to: receive from a host one or more vectors of input values of a convolutional neural network layer; perform an in-array matrix multiplication of the vectors of input values and the filter in one or both of a column oriented mode, wherein the array is accessed on a column by column basis skipping columns having an indication of storing all zero weight values, and a row oriented mode, wherein the array is accessed on a row by row basis skipping rows having an indication of storing all zero weight values; and provide a result of the in-array matrix multiplication to the host.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
an array of non-volatile memory cells, including a plurality of first access lines running in a first direction, a plurality of second access lines running in a second direction, and a plurality of non-volatile memory cells, each of the plurality of first access lines connected to one of the plurality of second access lines through one of the plurality of memory cells;
a register configured to hold a bit for a corresponding one of each of the plurality of first access lines indicating whether all of the memory cells connected to a corresponding first access line have a specified data value stored therein; and
one or more control circuits connected to the array of non-volatile memory cells and the register, the one or more control circuits configured to:
receive a plurality of input values;
sequentially apply the input values to the plurality of first access lines, skipping ones of the plurality of first access lines for which the corresponding bit of the register indicates that all of the memory cells connected thereto have the specified data value stored therein; and
accumulate an output of the array in response to sequentially applying the input values to the plurality of first access lines.

2. The apparatus of claim 1, wherein the plurality of first access lines are bit lines and the plurality of second access lines are word lines and the one or more control circuits are configured to concurrently apply the plurality of input values to a corresponding plurality of the word lines and to sequentially determine a current in each of the bit lines that are not skipped in response to register indicating that all of the memory cells connected thereto have the specified data value stored therein.

3. The apparatus of claim 2, wherein the register is further configured to hold a bit for a corresponding one of each of the word lines indicating whether all of the memory cells connected to the corresponding plurality of first access lines have the specified data value stored therein, and wherein the one or more control circuits are further configured to sequentially apply the plurality of input values to the corresponding plurality of the word lines that are not skipped in response to register indicating that all of the memory cells connected thereto have the specified data value stored therein and to concurrently determine the current in each of the bit lines.

4. The apparatus of claim 1, wherein the plurality of first access lines are word lines and the plurality of second access lines are bit lines and the one or more control circuits are configured to sequentially apply the plurality of input values to a corresponding plurality of the word lines that are not skipped in response to register indicating that all of the memory cells connected thereto have the specified data value stored therein and to concurrently determine a current in each of the bit lines.

5. The apparatus of claim 1, wherein the array of non-volatile memory cells is configured to hold weights of a neural network and wherein the specified data value corresponds to weight value of zero.

6. The apparatus of claim 1, wherein the one or more control circuits are further configured to:
read a data value stored in each of the memory cells;
determine from the data values the plurality of first access lines for which all of the memory cells connected thereto store the specified data value stored therein; and
set the bit for the corresponding one of each of the plurality of first access lines based on determined first access lines for which all of the memory cells connected thereto store the specified data value.

7. The apparatus of claim 1, wherein the memory cells are part of a monolithic three-dimensional semiconductor memory device where the memory cells are arranged in multiple physical levels above a substrate.

8. The apparatus of claim 7, wherein the array of non-volatile memory cells is formed according to a cross-point architecture.

9. The apparatus of claim 1, wherein the non-volatile memory cells include phase change memory (PCM) based memory cells.

10. The apparatus of claim 1, wherein the non-volatile memory cells include phase resistive random access memory (ReRAM) based memory cells.

11. A method, comprising:
receiving at a non-volatile memory device a vector of input values from a host;
maintaining, in a register on the non-volatile memory device, for a filter of a convolutional neural network stored in an array of the non-volatile memory device of one or both of an indication of columns that store all zero weight values or an indication of rows that store all zero weight values; and
performing an in-memory matrix multiplication operation between the vector of input values and the filter, comprising:
translating each input value of the vector into a corresponding voltage level; and
applying the voltage levels to rows of the array in either a column oriented mode, wherein the array is accessed on a column by column basis skipping columns having the indication of storing all zero weight values, and a row oriented mode, wherein the array is accessed on a row by row basis skipping rows having the indication of storing all zero weight values.

12. The method of claim 11, wherein the register stores the indication of columns that store all zero weight values and the in-memory matrix multiplication operation includes:
concurrently applying the input values to the plurality of the rows; and
sequentially determining the current in each of the columns of the array that are not skipped in response to register indicating that the column stores all zero weight values.

13. The method of claim 11, wherein the register stores the indication of rows that store all zero weight values and the in-memory matrix multiplication operation includes:
sequentially applying the input values to the plurality of rows that are not skipped in response to register indicating that the row stores all zero weight values; and
concurrently determining a current in each of columns of the array.

14. The method of claim 11, further comprising:
prior to receiving the vector of input values, determining the one or both of columns that store all zero weight values and rows that store all zero weight values and storing the corresponding indications in the register independently of the host.

15. The method of claim 11, further comprising:
prior to receiving the vector of input values, determining by the host of the one or both of columns that store all zero weight values and rows that store all zero weight values.

16. A non-volatile memory circuit, comprising:
an array of a plurality of non-volatile memory cells formed into column and rows, each of the non-volatile memory cells configured to store a weight of a filter of a convolutional neural network;
a register configured to store one or both of an indication of columns that store all zero weight values and an indication rows that store all zero weight values; and
one or more control circuits connected to the array and to the register and configured to:
receive from a host one or more vectors of input values of a convolutional neural network layer;
perform an in-array matrix multiplication of the vectors of input values and the filter in one or both of a column oriented mode, wherein the array is accessed on a column by column basis skipping columns having the indication of storing all zero weight values, and a row oriented mode, wherein the array is accessed on a row by row basis skipping rows having the indication of storing all zero weight values; and
provide a result of the in-array matrix multiplication to the host.

17. The non-volatile memory circuit of claim 16, the one or more control circuits further configured to, independently of the host determine the one or both of columns that store all zero weight values and rows that store all zero weight values and store the corresponding indications in the register.

18. The non-volatile memory circuit of claim 16, wherein the register stores the indication of columns that store all zero weight values, and
wherein the one or more control circuits are configured to concurrently apply the input values of each of the vectors of input values to a corresponding plurality of the rows and to sequentially determine a current in each of the columns that are not skipped in response to the register indicating the column storing all zero weight values.

19. The non-volatile memory circuit of claim 18, wherein the register further stores the indication of rows that store all zero weight values, and
wherein the one or more control circuits are further configured to sequentially apply the input values of each of the vectors of input values to a corresponding one of the rows that are not skipped in response to the register indicating the row storing all zero weight values and to concurrently determine a current in each of the columns.

20. The non-volatile memory circuit of claim 16, wherein the register stores an indication of rows that store all zero weight values, and
wherein the one or more control circuits are configured to sequentially apply the input values of each of the vectors of input values to a corresponding one of the rows that are not skipped in response to the register indicating the row storing all zero weight values and to concurrently determine a current in each of the columns.

* * * * *